(12) United States Patent
Liu et al.

(10) Patent No.: US 9,159,041 B1
(45) Date of Patent: Oct. 13, 2015

(54) SYSTEM AND METHOD OF FULFILLING TRADE REQUESTS CORRESPONDING TO AIRLINE FLIGHT SEQUENCES BY GENERATING OPTIMIZATION NETWORK

(75) Inventors: Xin Liu, Grapevine, TX (US); Abhinav Sharma, Flower Mound, TX (US); Shengnan Wu, Grapevine, TX (US); Tuell Green, Euless, TX (US); June Ma, Colleyville, TX (US)

(73) Assignee: American Airlines, Inc., Fort Worth, TX (US)

( * ) Notice: Subject to any disclaimer, the term of this patent is extended or adjusted under 35 U.S.C. 154(b) by 297 days.

(21) Appl. No.: 13/548,450

(22) Filed: Jul. 13, 2012

(51) Int. Cl.
*G06Q 10/00* (2012.01)
*G06Q 10/06* (2012.01)

(52) U.S. Cl.
CPC .............................. *G06Q 10/063116* (2013.01)

(58) Field of Classification Search
CPC ............................................. G06Q 10/063116
USPC ................................................. 705/7.11–7.42
See application file for complete search history.

(56) References Cited

U.S. PATENT DOCUMENTS

| | | | |
|---|---|---|---|
| 8,073,726 B1* | 12/2011 | Liu et al. | 705/7.22 |
| 2003/0167110 A1* | 9/2003 | Smith et al. | 701/3 |
| 2005/0004828 A1* | 1/2005 | deSilva et al. | 705/9 |
| 2005/0096962 A1* | 5/2005 | Narasimhan et al. | 705/9 |
| 2008/0319822 A1* | 12/2008 | LaJoie et al. | 705/9 |
| 2010/0106556 A1* | 4/2010 | Vee et al. | 705/10 |
| 2013/0159206 A1* | 6/2013 | Barahona et al. | 705/338 |

* cited by examiner

*Primary Examiner* — Sujay Koneru
(74) *Attorney, Agent, or Firm* — Haynes and Boone, LLP

(57) ABSTRACT

A system and method according to which data associated with a plurality of trade requests is received, and an optimization network is generated, the optimization network including a plurality of nodes corresponding to the trade requests. The nodes are ranked in accordance with at least one business objective, and one or more of the requests are fulfilled in an order based on the ranking of the nodes. To fulfill the one or more requests, a solution is generated, the solution complying with one or more predetermined rules. In an exemplary embodiment, each of the trade requests corresponds to a request to trade a work assignment. In an exemplary embodiment, each trade request is a request by an airline crew member to trade an airline flight sequence, and the at least one business objective is based on airline crew member seniority.

5 Claims, 17 Drawing Sheets

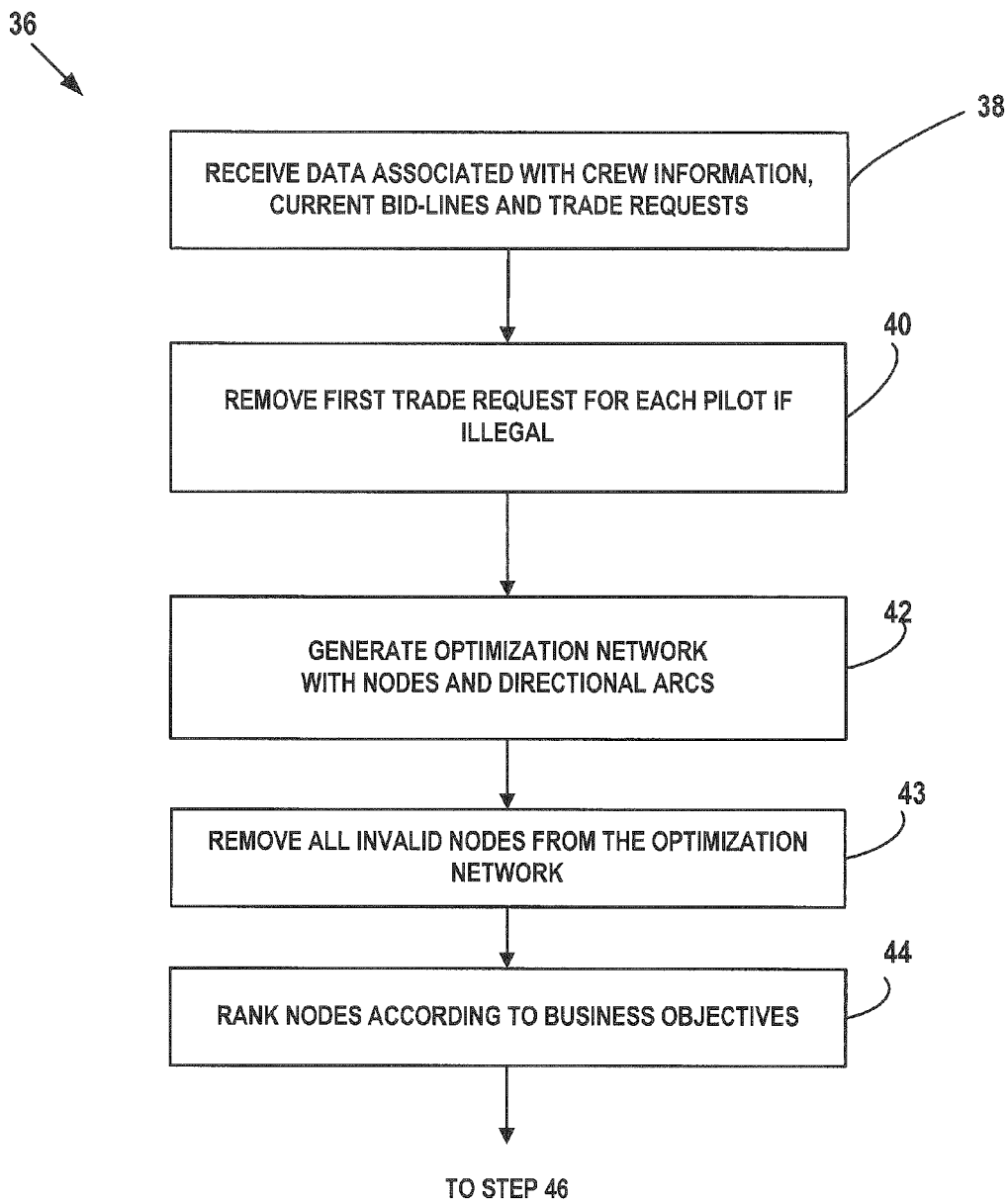

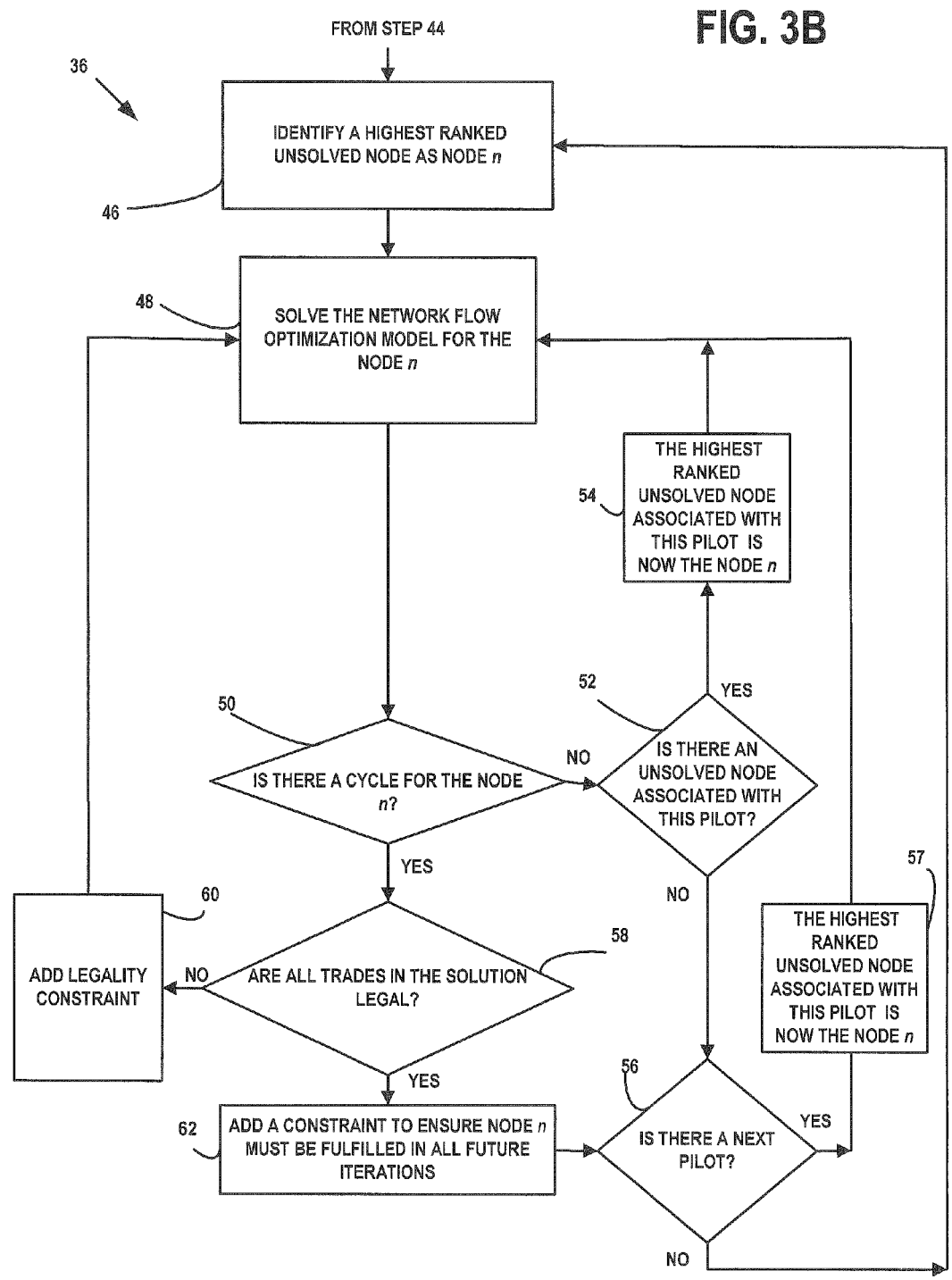

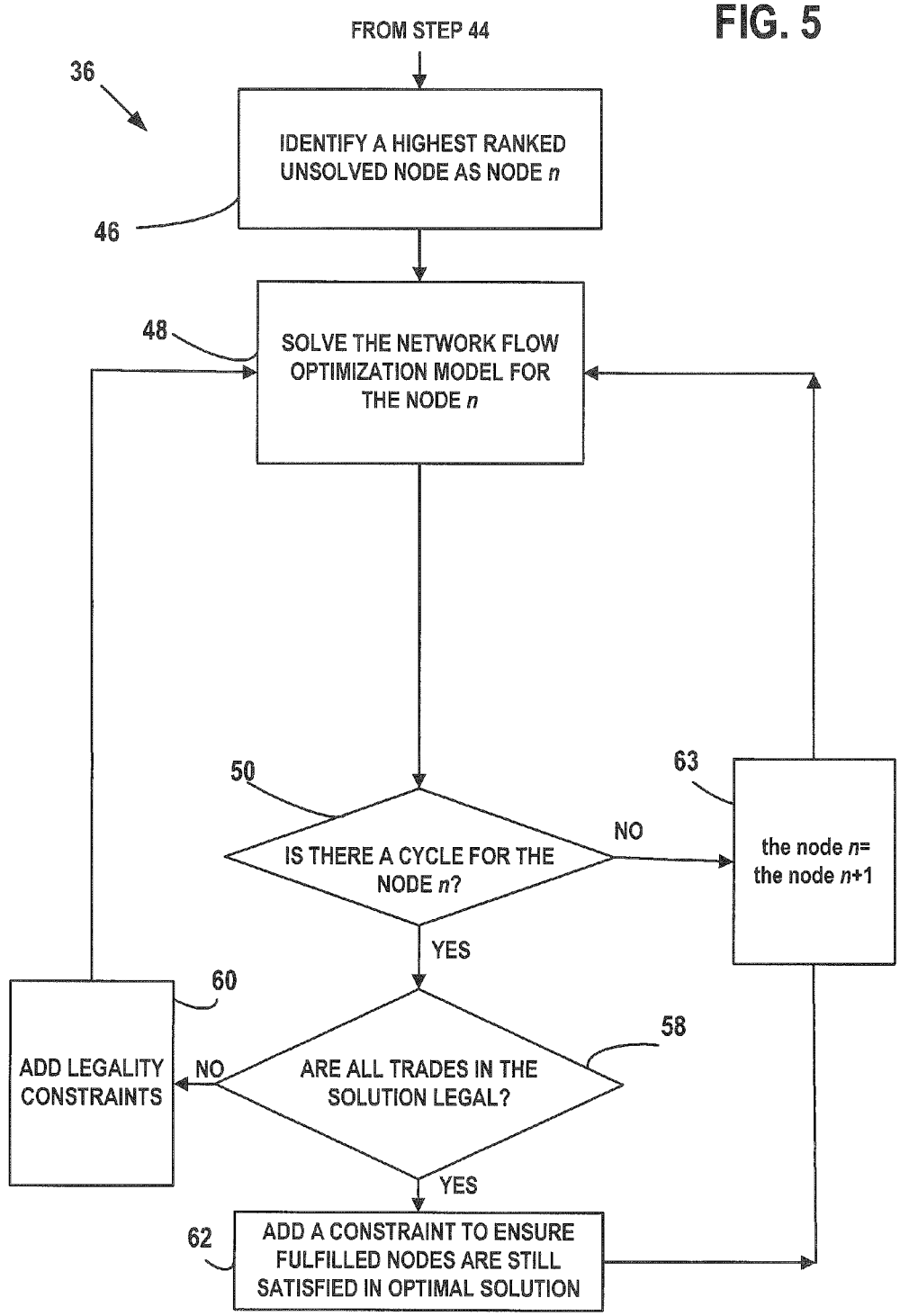

FIG. 10

| Pilot # | Ballots | Request 1 | | | Request 2 | | | Request 3 | | | Request 4 | | |
|---|---|---|---|---|---|---|---|---|---|---|---|---|---|
| | Drop | Pickup | Denied due to: | Drop | Pickup | Denied due to: | Drop | Pickup | Denied due to: | Drop | Pickup | Denied due to: |
| 1 | a1 | g3 | | h2 | c3 | | b2 | d1 | P4 - 1st request | a4 | f1 | |
| 2 | b1 | c2 | | b2 | g4 | | b3 | d1 | NTA | b4 | g2 | |
| 3 | c1 | a4 | NTA | c2 | d3 | | c3 | h2 | | | | |
| 4 | d1 | e2 | | d2 | e1 | | d3 | f1 | | d4 | c1 | NTA |
| 5 | e1 | f2 | | e2 | d1 | | e3 | b2 | | e3 | f4 | |
| 6 | f1 | b1 | | f2 | b1 | NTA | f3 | h1 | | f2 | d2 | |
| 7 | a1 | h2 | | g2 | b4 | | g4 | c3 | P1- 2nd request | g4 | e3 | P5 - 1st request |
| 8 | h1 | f3 | | h2 | a1 | | h5 | e2 | NTA | | | |
| 9 | i1 | a4 | | i2 | e1 | | i3 | a1 | | i4 | e4 | |
| 10 | f1 | f1 | NTA | j2 | i2 | | j5 | f1 | P8 - 1st request | g4 | e3 | P5- 3rd request |

79b

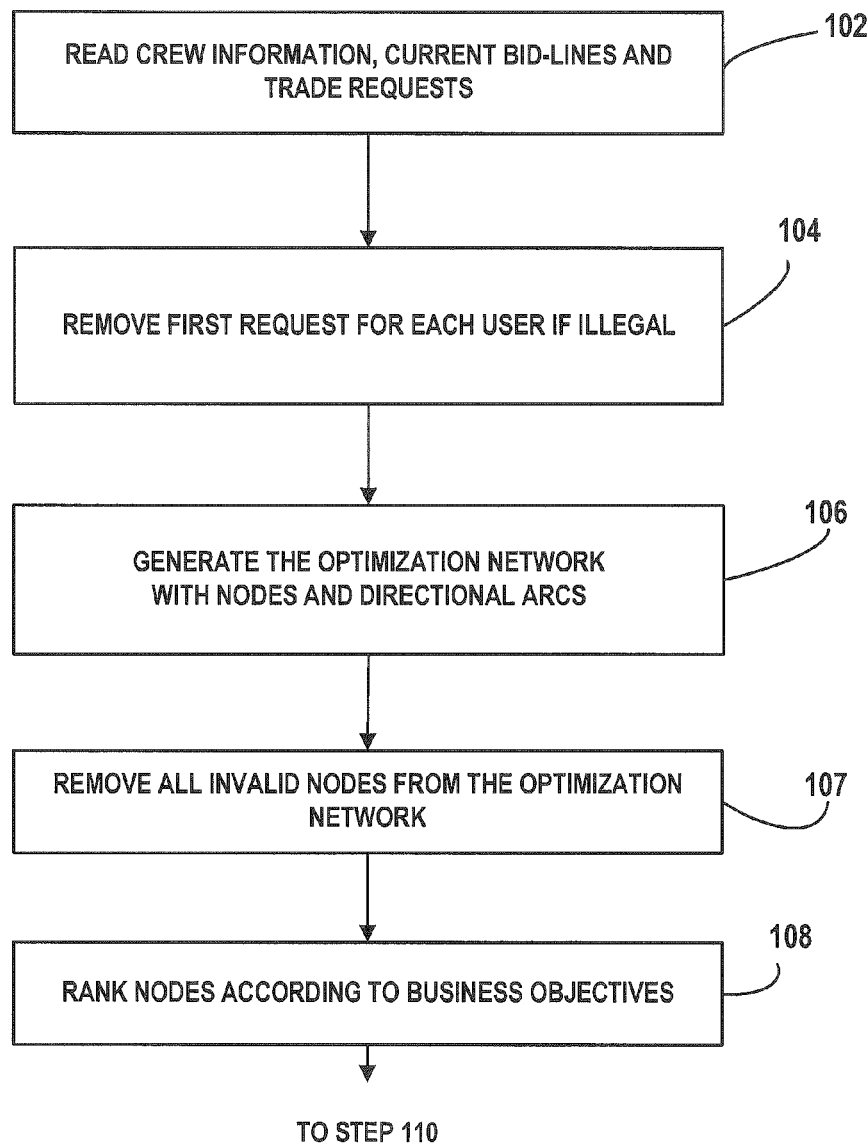

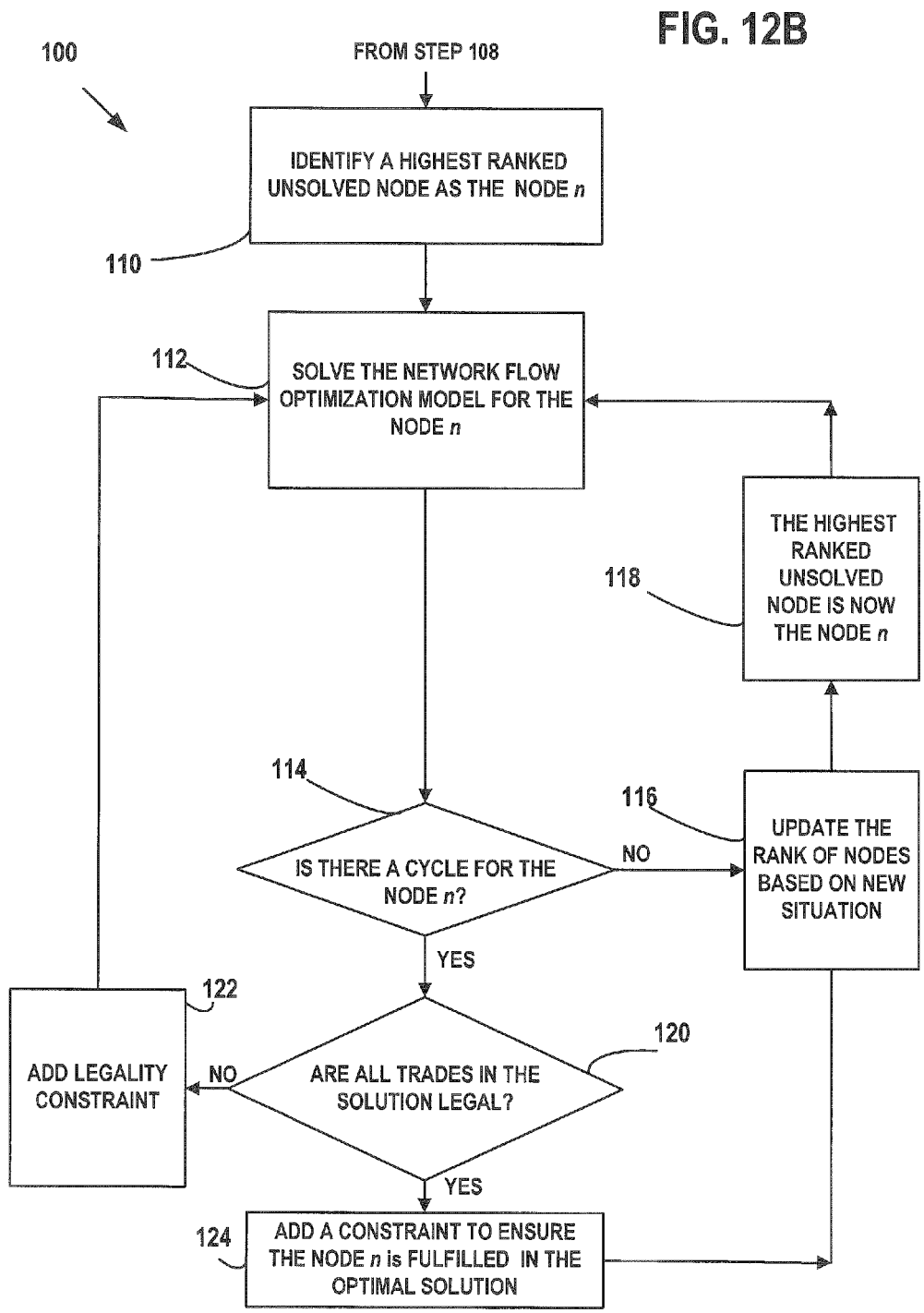

SYSTEM AND METHOD OF FULFILLING TRADE REQUESTS CORRESPONDING TO AIRLINE FLIGHT SEQUENCES BY GENERATING OPTIMIZATION NETWORK

BACKGROUND

The present disclosure relates in general to a system and method of fulfilling trade requests. In one embodiment, trip assignments are traded between airline crew members based on seniority and equity.

BRIEF DESCRIPTION OF THE DRAWINGS

FIGS. 3A and 3B are flow chart illustrations of a method of operating the system of FIG. 1, according to an exemplary embodiment.

FIG. 5 is a flow chart illustration of a modification to the method of FIGS. 3A and 3B.

FIG. 10 is a table illustrating an optimal solution for the table of requests in FIG. 8, according to the exemplary embodiment.

FIGS. 12A and 12B are flow chart illustrations of a method of operating the system of FIG. 1, according to an exemplary embodiment.

DETAILED DESCRIPTION

Figure 1:
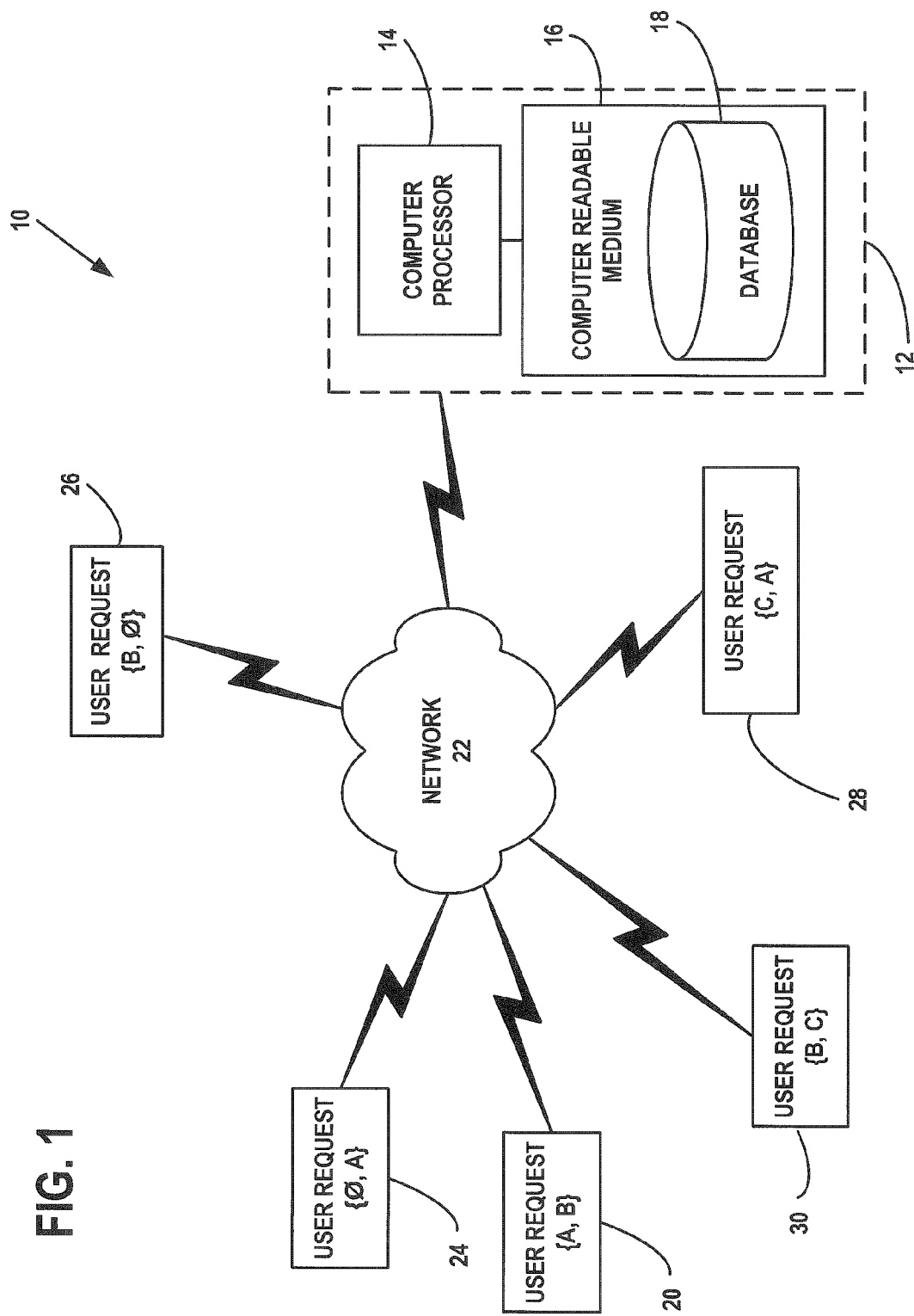
FIG. 1 is a diagrammatic illustration of a system according to an exemplary embodiment.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, while many of the examples provided below pertain to transactions often conducted in the course of airline industry business, aspects of the present disclosure are applicable and/or readily adaptable to other industries, including rail, bus, cruise and other travel or shipping industries, rental car industries, hotels and other hospitality industries, entertainment industries, and other industries having workforces having shift assignments that can be traded.

In an exemplary embodiment, as illustrated in FIG. 1, a system is generally referred to by the reference numeral 10 and includes a module 12, which includes a computer processor 14 and a computer readable medium 16 operable coupled thereto. A database 18 is also stored in the computer readable medium 16. A user trade request, represented by node 20, may be transferred via a network 22 to the module 12. Additional user trade requests represented by nodes 24, 26, 28 and 30 may be transferred via the network 22 to the module 12. In an exemplary embodiment, the network 22 includes the Internet, one or more local area networks, one or more wide area networks, one or more cellular networks, one or more wireless networks, one or more voice networks, one or more data networks, one or more communication systems, and/or any combination thereof.

In an exemplary embodiment, the nodes 20, 24, 26, 28 and 30 are created by a user such as an airline crew member; such an airline crew member may be an airline pilot or a flight attendant. Reference to a pilot as a user is not meant to be limiting, but only to serve as an example of a user. In addition to a pilot, a flight attendant or any other airline crew member may be a user. The pilots are each assigned a schedule of flights for one month's time, which consists of a plurality of different flight segments. In one embodiment, a bid-line is a pilot's schedule of flying over a period of one contractual month. In an exemplary embodiment, a bid-line can comprise a series of flight sequences, which are also called trips or pairings, with one or more days off in between each sequence. In an exemplary embodiment, a flight sequence is a set of flights that the pilot is assigned to fly that covers one or more consecutive days and starts and ends at the pilot's crew base. For example, the pilot's crew base could be DFW, MIA, etc. Generally, bid-lines are awarded based on the pilot's seniority. However, often the pilot would like to alter his or her bid-line by dropping or adding or both adding and dropping specific trips. The nodes 20, 24, 26, 28 and 30 represent trade requests made by pilots to drop trips from their schedules and/or to pick up other trips. A trade request to drop a trip can be due to multiple schedule conflicts, such as a previously planned training or vacation, personal reasons, and the like. A trade request to pick up a trip can be due to multiple reasons as well, such as for pay purposes, personal preferences, and the like. The trade requests can involve dropping a trip, adding a trip, or both.

As shown in FIG. 1, the node 20 is portrayed as a notation of {trip(s) to be dropped, trip(s) to be picked up}. Therefore, the node 20 {A, B} represents a trade request to drop trip A and pick up trip B. The node 24 {Ø, A} denotes an absence of a trade request to drop a trip and represents a trade request to pick up trip A. The node 26 {B, Ø} represents a trade request to drop trip B and an absence of a trade request to pick up a trip. The node 28 {C, A} represents a trade request to drop trip C and pick up trip A. The node 30 {B, C} represents a trade request to drop trip B and pick up trip C. A conditional node is a node in which the user is willing to drop a trip only if he or she can pick up another trip in return, or vice versa. The nodes 20, 28 and 30 are conditional nodes. An unconditional node is a node in which the user only requests to drop a trip or only requests to pick up a trip. The nodes 24 and 26 are unconditional nodes.

Figure 2:
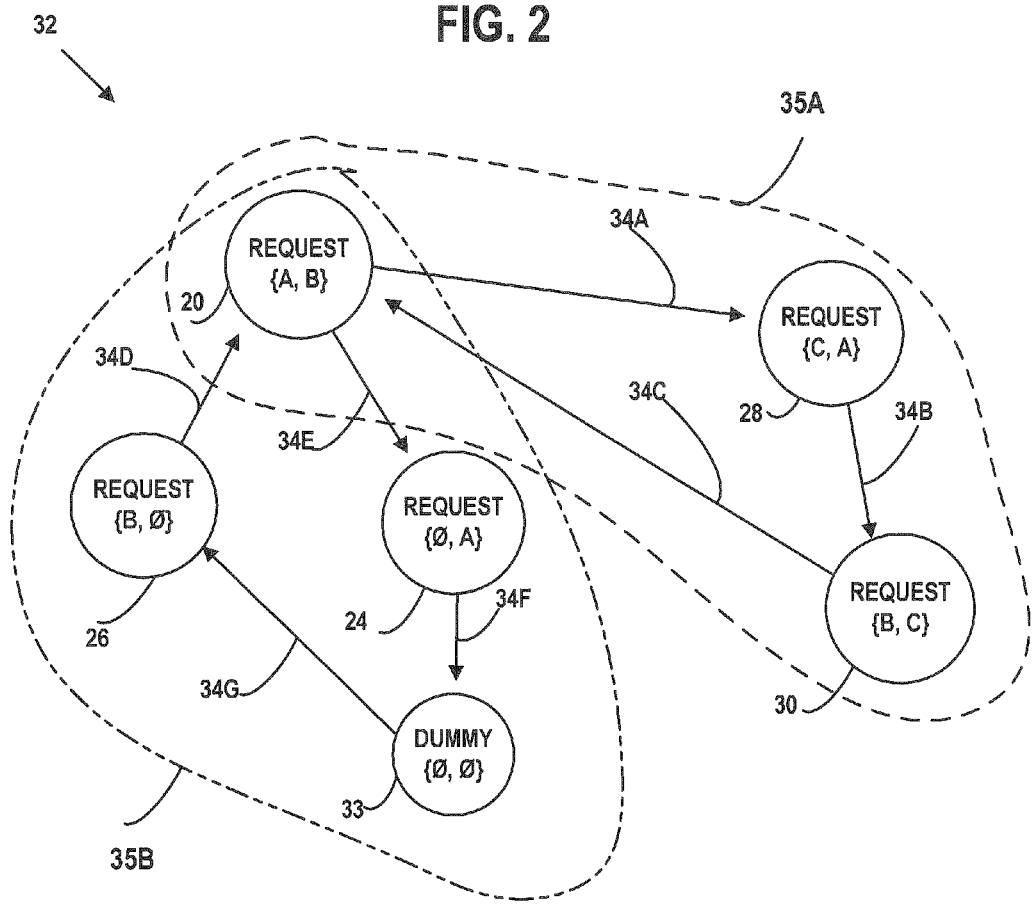
FIG. 2 is a diagrammatic illustration of an optimization network according to an exemplary embodiment.

In an exemplary embodiment, as illustrated in FIG. 2 with continuing reference to FIG. 1, an optimization network is generally referred to by the reference numeral 32 and includes the nodes 20, 24, 26, 28 and 30. The network 32 also includes a "dummy" node 33 {Ø, Ø}, which represents an absence of a trade request to drop a trip and an absence of a request to pick up a trip.

In an exemplary embodiment, a directional arc 34A connects the node 20 to the node 28. The directional arc 34A represents a supply-to-demand relationship between the node 20 and the node 28. The directional arc 34A points from the node 20 to the node 28 because the user associated with the node 20 wants to drop trip A and the user associated with the node 28 wants to pick up trip A. A directional arc 34B points from the node 28 to the node 30 because the user associated with the node 28 wants to drop trip C while the user associated with the node 30 wants to pick up trip C. A directional arc 34C points from the node 30 to the node 20 because the user associated with the node 30 wants to drop trip B and the user associated with the node 20 wants to pick up trip B. A directional arc 34D points from the node 26 to the node 20 because the user associated with the node 26 wants to drop trip B and the user associated with the node 20 wants to pick up trip B. A directional arc 34E points from the node 20 to the node 24 because the user associated with the node 20 wants to drop trip A and the user associated with the node 24 wants to pick up trip A. A directional arc 34F points from the node 24 to the dummy node 33 because the user associated with the node 24 has no request to drop a trip and the dummy node 33 is associated with no request to drop a trip. A directional arc 34G points from the dummy node 33 to the node 26 because the dummy node 33 is associated with no request to add a trip and the user associated with the node 26 has no request to add a trip.

In an exemplary embodiment, a directed cycle 35A includes the directional arc 34A, which points from the node 20 to the node 28 because the user associated with the node 20 wants to drop trip A and the user associated with the node 28 wants to pick up trip A; the directional arc 34B, which points from the node 28 to the node 30, because the user associated with the node 28 wants to drop trip C and the user associated with the node 30 wants to pick up trip C; and the directional arc 34C, which points from the node 30 to the node 20 because the user associated with the node 30 wants to drop trip B and the user associated with the node 20 wants to pick up trip B. In an exemplary embodiment, the directed cycle 35A represents all trade requests associated with the nodes 20, 28 and 30 being fulfilled, that is, a feasible trade of trips.

A directed cycle 35B includes the directional arc 34D, which points from the node 26 to the node 20 because the user associated with the node 26 wants to drop trip B and the user associated with the node 20 wants to pick up trip B; the directional arc 34E, which points from the node 20 to the node 24, because the user associated with the node 20 wants to drop trip A and the user associated with the node 24 wants to pick up trip A; the directional arc 34F, which points from the node 24 to the dummy node 33 because the user associated with the node 24 has no request to drop a trip and the dummy node 33 is associated with no request to drop a trip; and the directional arc 34G, which points from the dummy node 33 to the node 26 because the dummy node 33 is associated with no request to add a trip and the user associated with the node 26 has no request to add a trip. The directed cycle 35B represents all trade requests associated with the nodes 20, 24 and 26 being fulfilled, that is, a feasible trade of trips. In several exemplary embodiments, when additional nodes are added, more directed cycles can be formed. In several exemplary embodiments, while the nodes associated with the cycle 35A can be fulfilled or the nodes associated with the cycle 35B can be fulfilled, it is not possible to satisfy the nodes associated with both the cycles 35A and 35B because both require the node 20. In an exemplary embodiment, each node can belong to at most one awarded directed cycle. Awarding or fulfilling the nodes associated with either the cycle 35A or 35B makes awarding the nodes associated with the remaining cycle infeasible.

In an exemplary embodiment, as illustrated in FIGS. 3A and 3B, a method of operating the system 10 is generally referred to by the reference numeral 36. In an exemplary embodiment, the execution of the method 36 results in an optimal solution, with trade requests from multiple users being considered simultaneously and satisfied in an order based on seniority and equity.

Data is received at step 38 and represents all of the relevant information pertaining to the system 10. In an exemplary embodiment, at the step 38, an airline pilot can use a computer device to transmit at least a portion of the data in the node 20 via the network 22 to the module 12. Other data can be received from other sources, such as data regarding pilot seniority being received from the airline crew management system. For example, the data received at the step 38 is associated with information regarding the airline crew members, current bid-lines and trade requests. The data can be received from an operational system. In one embodiment, the data is downloaded in flat files. The data could also be downloaded and stored in a relational database or any other data repository. In an exemplary embodiment, the data includes basic information regarding the airline crew members, such as their seniority, their current schedule assignments including information about sequences (trips) and bid-lines, vacation schedules, and training schedules, user input trade preferences, and the like.

Before, during or after the execution of the method 36, the data received in the step 38 is continually and automatically updated, continually and automatically updated at predetermined time intervals, and/or any combination thereof, thereby ensuring that the data received in the step 38 remains current and accurate. In one embodiment, the step 38 further includes refreshing the received data with recent updates of the data from the module 12 and/or the aforementioned one or more data sources, issuing one or more queries for updated data from the module 12 and/or the aforementioned one or more data sources, issuing one or more queries for updated data from the module 12 and/or the aforementioned one or more data sources at predetermined time intervals, issuing one or more queries for all of the data previously received in the step 38, issuing one or more queries for all of the data previously received in the step 38 at predetermined time intervals, and/or any combination thereof.

Before, during or after the step 38, the first trade request of each user, if the user has submitted a plurality of trade requests, will be verified against a predetermined set of rules at step 40. In an exemplary embodiment, the predetermined set of rules relates to contractual rules applicable to a pilot or user, such as rules from the Allied Pilots Association, the FAA and the like. If the first trade request is considered illegal, meaning it violates the predetermined set of rules, then the first trade request is removed from the system 10. The step 40 is optional, and may be omitted if desired. The purpose of the step 40 is to potentially reduce the number of nodes in the optimization network, which will reduce the time it takes to identify the optimal solution.

Before, during or after the step 40, the optimization network 32 is generated at step 42 using the nodes 20, 24, 26, 28 and 30 and the directional arcs 34A, 34B, 34C, 34D, 34E, 34F and 34G. In another embodiment, weighted arcs, which will be discussed in detail below, are included in the optimization network.

Before, during or after the step 42, all invalid nodes are removed from the optimization network in step 43. An invalid node is a node that cannot be included in a directed cycle in the optimization network 32, that is, if the node cannot be associated with a feasible trade of trips. If a node is invalid, that node is removed from the optimization network 32. None of the nodes 20, 24, 26, 28 and 30 are invalid. Note that the step 43 is an optional step, and may be omitted if desired. The purpose of the step 43 is to reduce the total number of nodes in the optimization network 32, which will reduce the processing time required to find the optimal solution.

Before, during or after the step 43, the nodes 20, 24, 26, 28 and 30 are ranked at step 44, according to a business objective, such as seniority levels. In other embodiments, the ranking can be based on other business objectives, can be based on one objective or multiple objectives, can be based or laid out in one dimension or in multiple dimensions, or can be static or dynamic as the algorithm unfolds. In an exemplary embodiment, the ranking strategy and associated optimization algorithm ensures that a node associated with a higher ranked request will be satisfied before a node associated with a lower ranked request is satisfied, if the node associated with the higher ranked request can be satisfied. In an exemplary embodiment of the method 36, the nodes 20, 24, 26, 28 and 30 are ranked based on a combination of the seniority of the users or airline crew members and a measure of equity among the airline crew members. That is, once one node associated with one pilot is satisfied or attempted to be satisfied, a node associated with a pilot with lesser seniority is then solved. In another embodiment not depicted in FIGS. 3A and 3B, all nodes associated with one pilot are satisfied, if they can be satisfied, before satisfying a node associated with a pilot with lesser seniority. In an exemplary embodiment, a strict seniority rule applies and no node can be satisfied if it prevents a higher ranked node from being satisfied.

Before, during or after the step 44, a highest ranked unsolved node is identified as node n at step 46.

Before, during or after the step 46, the node n is solved at step 48. In an exemplary embodiment, at the step 48, a mixed-integer program formulation may be used to solve the node n. In an exemplary embodiment, the mixed-integer program used at the step 48 can be described as follows:

N is the set of nodes in the network excluding the dummy node,

NA is the set of all nodes in the network including the dummy node,

In(i) is the set of directional arcs pointing into a node i,

Out(i) is the set of directional arcs emanating from a node i, and $x_{i,j}$ is the unit flow from the node i to j, where $$x_{i,j} = \begin{cases} 1 & \text{if unit flow exists from the node } i \text{ to } j, \\ 0 & \text{otherwise} \end{cases}$$

In an exemplary embodiment, the mixed-integer program used at the step 48 can be mathematically written as follows:

Maximize $$\sum_{i \in In(n)} x_{i,n} \quad (1)$$

Subject to:

$$\sum_{j \in Out(i)} x_{i,j} - \sum_{j \in In(i)} x_{i,j} = 0 \quad \forall i \in NA \quad (2)$$

$$\sum_{j \in Out(i)} x_{i,j} \leq 1 \quad \forall i \in N \quad (3)$$

where $x_{i,j} \in \{0,1\} \; \forall i \in NA, j \in Out(i)$.

The objective of function (1) is to find all directional arcs that involve the node n. In an exemplary embodiment, the function (1) maximizes the flow, or amount of directional arcs associated with a node, into the node n from other nodes. Constraint set (2) ensures that the flow passing through each node is balanced, that is, the number of directional arcs entering into each node equals the number of directional arcs exiting out of each node. Constraint set (3) ensures that any node is not part of more than one cycle in the optimal solution, with the flow passing through each node being either zero or one.

Before, during or after the step 48, it is determined at step 50 whether a cycle involving the node n exists. If the value of the function (1) is 1, then a cycle that involves the node n exists. If the value of the function (1) is 0, then no cycles are available that involve the node n, and step 52 is the next step.

Before, during or after the step 50, it is determined at the step 52 if there is another unsolved node for the pilot, that is, if the pilot has any other nodes that can be attempted to fulfill. If so, then the step 54 is the next step. If not, then step 56 is the next step.

At the step 54, a highest ranked unsolved node associated with the pilot is identified as the node n. At the step 48, the optimization model solves for the node n that was identified in the step 52 and associated with the pilot in the step 54. Again at the step 50, it is determined whether a cycle involving the node n exists. If the value of the function (1) is 0, then no cycles are available to satisfy the node n and again, the next step is the step 52. At the step 52, it is determined whether an unsolved node associated with this pilot exists. If so, then the steps 54, 48, 50 and 52 are repeated until it is determined at the step 52 that there is no unsolved node associated with this pilot, at which point the step 56 is executed.

Before, during or after the step 52, it is determined at the step 56 if there is a next pilot, that is, if there is a pilot with lesser seniority. If so, then step 57 is the next step. If it is determined at the step 56 that there is no next pilot, then an attempt to solve a node for each pilot has been made. The next step is the step 46, at which a highest ranked unsolved node is identified as node n.

At the step 57, a highest ranked unsolved node associated with the next pilot is identified as the node n, and the next step is the step 48, using the node n identified in the step 57. At the step 50, it is determined whether there is a cycle involving the node n identified in the step 57. If the value of the function (1) is 1 and subject to the constraints, then there is a cycle that involves the node n, and the next step is step 58.

At the step 58, all directional arcs or trades associated with the optimal solution are checked to ensure that they are legal, or comply with the predetermined set of rules.

In an exemplary embodiment, if it is determined at the step 58 that at least one trade in the optimal solution is not legal, then the next step is step 60. At the step 60, a legality constraint is added for each illegal trade in the optimal solution. Each legality constraint prevents the set of directional arcs that produced the one or more illegal conditions from being included in any future solutions. In one embodiment, the mixed-integer program relating to the legality constraint can be described as follows:

A is a set of directional arcs in a solution that makes one or more pilot bid-lines illegal,
Q is a super set of all identified A sets, and
a is the number of directional arcs in set A.
A general legality constraint can be written as follows:

$$\sum_{(i,j)_{1...a} \in A} x_{i,j} \leq a - 1 \quad \forall A \subseteq Q \tag{4}$$

Constraint set (4) prevents an illegal combination of nodes or a cycle that produces an illegal trade from being included in the optimal solution. In an exemplary embodiment and assuming that the addition of the cycle would result in an optimal solution that contains illegal trades, a legality constraint is added and the next step is the step 48. At the step 50, it is determined whether there is a cycle involving the node n. If the value of the function (1) is 1, then a cycle exists that involves the node n, and the next step is the step 58. At the step 58, all directional arcs proposed for the optimal solution are checked to ensure that they are legal, or comply with the predetermined rules. If all directional arcs are legal, then the next step is step 62.

At the step 62, a fulfillment constraint is added to ensure that the node n will be satisfied in the optimal solution. In one embodiment, the fulfillment constraint can be written as follows:

$$\sum_{i \in In(p)} x_{i,p} = 1 \quad \forall p \in F \tag{5}$$

Where:
p is the node with a feasible trade, and
F is the subset of prior nodes with feasible trades.

After the step 62, the next step is the step 56 and the process continues until an attempt has been made to fulfill or satisfy all nodes.

Figure 4A:
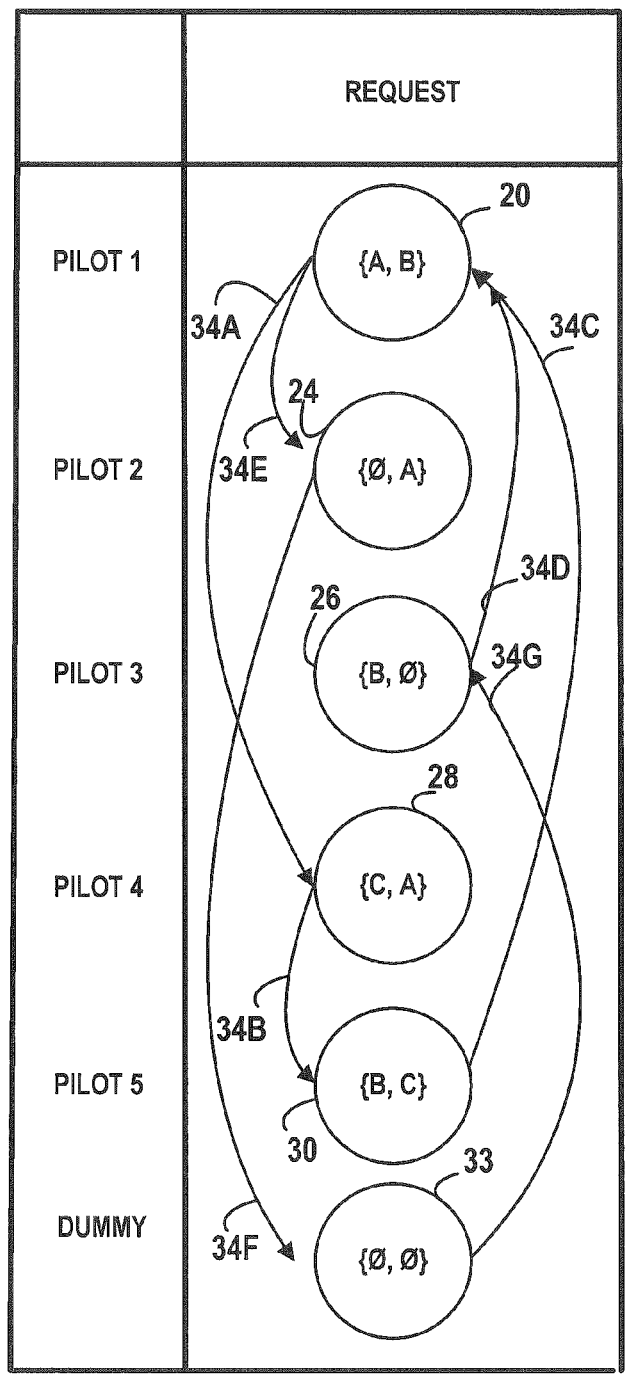
FIG. 4A is another diagrammatic illustration of the optimization network of FIG. 2.

In an exemplary embodiment, as illustrated in FIG. 4A with continuing reference to FIGS. 1-3B, the nodes 20, 24, 26, 28 and 30 have been ranked by seniority according to the step 44, with pilot 1 being the most senior pilot and pilot 5 being the least senior pilot. Data has already been received at the step 38 and no nodes have been removed at the steps 40 and 43 because none of the nodes 20, 24, 26, 28 and 30 are illegal or invalid. The optimization network 32 has been generated according to the step 42. In this example, a first unsolved node (the node 20) associated with the highest ranked pilot (pilot 1) has been identified as the node n according to the step 46. In this example, the flow into the node 20 from the other nodes has been maximized using function (1), subject to constraint sets (2) and (3). At the step 50, the cycle 35A is found, as described in connection with FIG. 2. The cycle 35A involves the nodes 20, 28 and 30. Now that cycle 35A has been identified for the node 20, the step 58 is the next step.

Figure 4B:
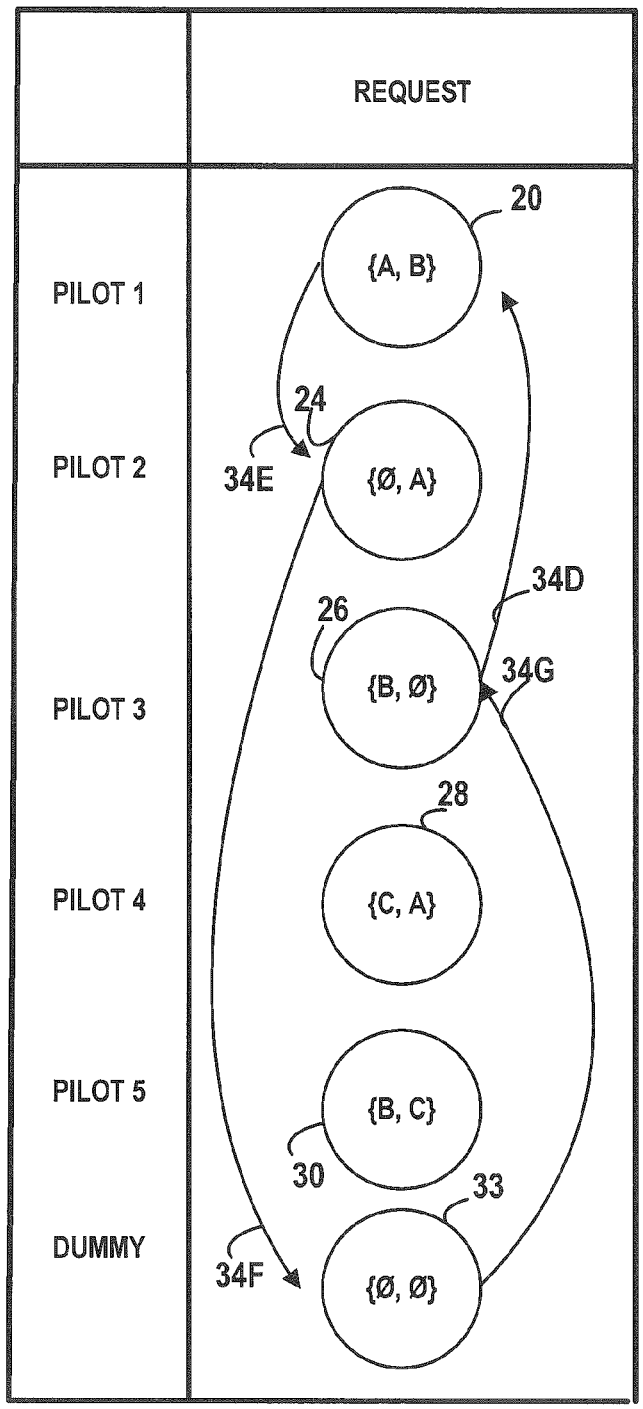
FIG. 4B is a diagrammatic illustration of an optimal solution, according to an exemplary embodiment.

For illustrative purposes, it will be assumed that at least one trade associated with the cycle 35A involving the nodes 20, 28 and 30 is considered illegal. Therefore, at the step 58, it will be determined that all directional arcs are not legal. The next step is the step 60, at which a legality constraint is added to prevent the cycle 35A from being included in the optimal solution. Then at the step 48, the optimization model is solved for the node 20. The cycle 35B involving the nodes 20, 24, 26 and the dummy node 33 is identified at the step 50 and the next step is the step 58. It can be assumed that all trades associated with the cycle 35B involving the nodes 20, 24, 26 and the dummy node 33 are legal; therefore the next step is the step 62, at which a fulfillment constraint is added to ensure the node 20 is included in the set of nodes with feasible trades. In this example, the next step is the step 56, at which it is determined that there is a next pilot (pilot 2). The next step is the step 57, at which the node 24 is identified as the node n. The next step is the step 48. At the step 48 in this example, the flow is maximized into the node 24 using function (1) subject to constraint sets (2), (3), (4) and (5). The cycle found for the node 24 at the step 50 is the cycle 35B, with all trades associated with the cycle 35B found to be legal at the step 58. A fulfillment constraint is added at the step 62, to include the node 24 in the set of nodes with a feasible trade. The same process occurs for the node 26. The optimization model is then solved for the node 28 at the step 48. However, at the step 50, no cycles are identified that involve the node 28. This is because of the prior legality constraint for the cycle 35A involving the nodes 20, 28 and 30. A similar result is found for the node 30. Therefore, the requests associated with the nodes 28 and 30 are not satisfied and the optimal solution is depicted in FIG. 4B.

However, assuming that all trades associated with the cycle 35A involving the nodes 20, 28 and 30 are considered legal, the optimal solution for this example is the same. If the trades associated with the cycle 35A were determined to be legal at the step 58, the constraint set (5) is added to ensure the node 20 (being the node n) will be satisfied in all future iterations. In this example, the next step is the step 56, at which it is determined that there is a next pilot (pilot 2). The next step is the step 57, at which the node 24 is identified as the node n. The next step is the step 48. At the step 48 in this example, the flow is maximized into the node 24 using function (1) subject to the constraint sets (2), (3) and now (5). At the step 50, it is determined that the cycle 35B fulfills the function (1) and the constraint sets (2), (3) and (5). This is because the cycle 35B will fulfill the node 20, which is now required by the constraint set (5). Assuming that all trades associated with the cycle 35B are determined to be legal at the step 58, a constraint is added at the step 62 to ensure that the node 24 is satisfied in all future iterations. The next step is the step 56, at which it is determined that there is a next pilot (pilot 3). The next step is the step 57, at which the node 26 is identified as the node n. The next step is the step 48. At the step 48 in this example, the flow is maximized into the node 26 using function (1) subject to constraint sets (2), (3) and (5). At the step 50, it is determined that the cycle 35B fulfills function (1) and constraint sets (2), (3) and (5). This is because the cycle 35B will satisfy the nodes 20 and 24, which is now required by the constraint set (5). Assuming that all trades associated with the cycle 35B are determined to be legal at the step 58, a constraint is added at the step 62 to ensure that the node 26 is satisfies in all future iterations. The next step is the step 57, at which the node 28 is identified as the node n. The next step is the step 48. At the step 48 in this example, the flow is maximized into the node 28 using function (1) subject to constraint sets (2), (3) and (5). At the step 50, it is determined that there are no cycles that fulfill function (1) and constraint sets (2), (3) and (5). While the cycle 35A fulfills node 28, it does not fulfill the constraint set (5), which requires fulfillment of the nodes 24 and 26. Therefore, there is no cycle for the node 28. Similarly, there is no cycle for the node 30 and the optimal solution is depicted in FIG. 4B.

In another exemplary embodiment, as illustrated in FIG. 5, the steps 52, 54, 56 and 57 of the method 36 may be omitted in favor of step 63, at which the node n is identified as the node n+1, that is, the highest ranked unsolved node that will be solved at the step 48.

Figure 6:
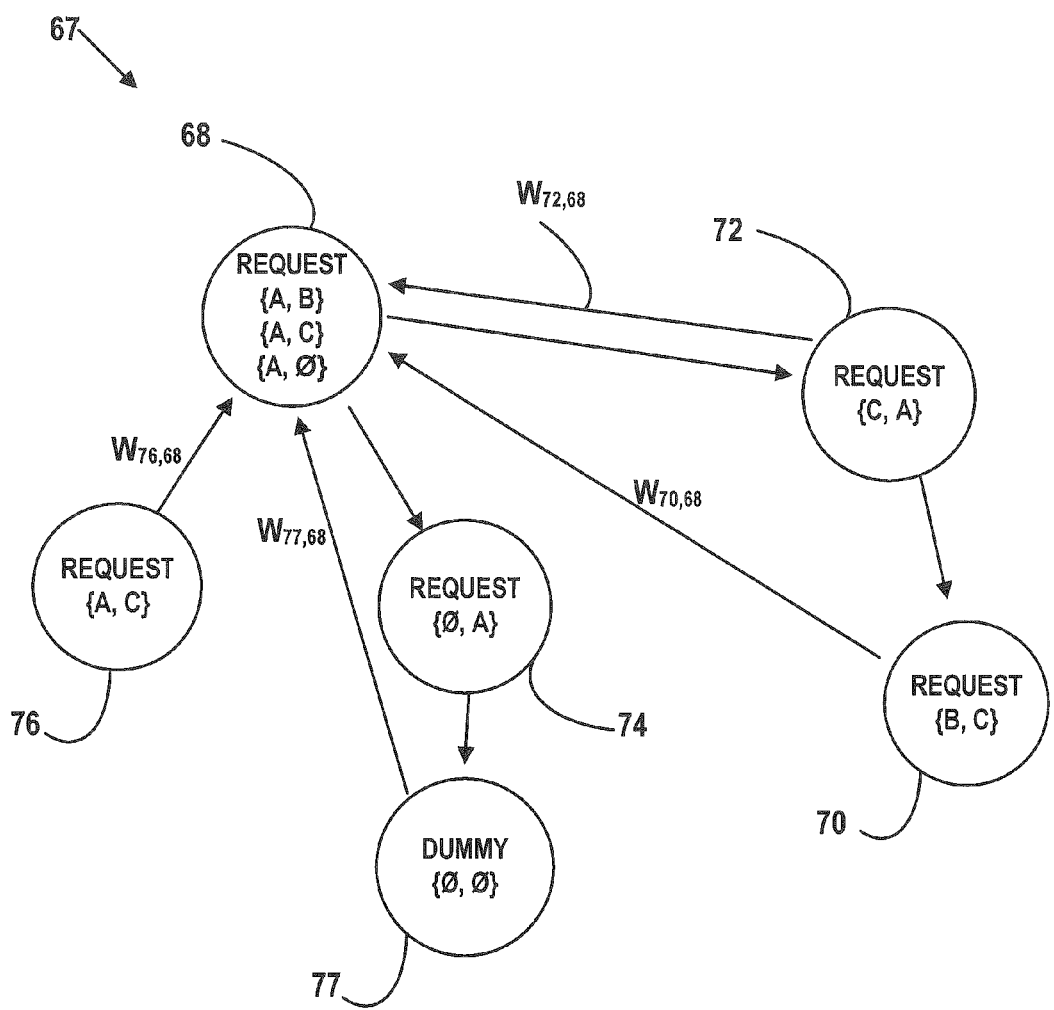
FIG. 6 is a diagrammatic illustration of an optimization network involving weighted arcs, according to an exemplary embodiment.

In an exemplary embodiment, as illustrated in FIG. 6, an optimization network is generally referred to by the reference numeral 67 and includes a node 68 associated with a nested request of {A, B}, {A, C} and {A, Ø}. Nodes 70, 72, 74 and 76 are associated with requests that are not nested. A nested request includes if-then instructions in a hierarchy of requests. The node 68 represents a request to drop trip A and pick up trip B, if trip B is not available, then pick up trip C, if trip C is not available, then only drop trip A. The {A, B} request to drop trip A and pick up trip B is the most desirable request from the pilot, and is placed at the highest level in the hierarchy of the node 68. The {A, C} request to drop trip A and pick up trip C is less desirable than the {A, B} request and is placed below the {A, B} request. The {A, Ø} request to only drop trip A is the least desirable and is placed at the lowest level in the hierarchy. In order to differentiate between high level and low level requests in the optimization network 67, a directional arc $W_{70,68}$ that points from the node 70 to the node 68 is given a high weight. This is because the user associated with the node 70 wants to drop trip B and the most desirable request {A, B} associated with the node 68 involves picking up trip B. A directional arc $W_{77,68}$ that points from a dummy node 77 to the node 68 is given a low weight because the dummy node 77 is associated with the least desirable {A, Ø} request of only dropping trip A. This weighting of directional arcs allows for the most desirable request or highest level in the hierarchy to be solved first. A comparison of the directional arc weights can be show as follows:

$$W_{70,68} > W_{72,68} = W_{76,68} > W_{77,68}. \qquad (6)$$

The directional arc $W_{70,68}$ has a greater weight than the directional arcs $W_{72,68}$, $W_{76,68}$ and the directional arc $W_{77,68}$ because the directional arc $W_{70,68}$ is associated with satisfying the most desirable {A, B} request. The directional arc $W_{72,68}$ has a weight equal to the weight of the directional arc $W_{76,68}$ because the directional arcs $W_{72,68}$ and $W_{76,68}$ are both associated with satisfying the {A, C} request, which is placed below the {A, B} request but above the {A, Ø} request. The directional arcs $W_{72,68}$ and $W_{76,68}$ have a greater weight than the directional arc $W_{77,68}$, which is associated with satisfying the least desirable {A, 0} request.

The function (1) is revised as follows to incorporate arc weights:

Maximize $$\sum_{i \in In(n)} w_{i,n} x_{i,n} \qquad (7)$$

where $w_{i,n}$ is the weight of the directional arc from node i to the node n.

The objective of function (7) is to find the directional arc with the highest possible arc weight that involves the node n. Once a legal directed cycle is found involving a directional arc with the highest possible arc weight that involves the node n, all directional arcs with lower arc weights that involve the node n are removed from the optimization network 67 for all subsequent steps. This modification ensures the highest achievable level of requests can be fulfilled in the subsequent steps.

Figure 7A:
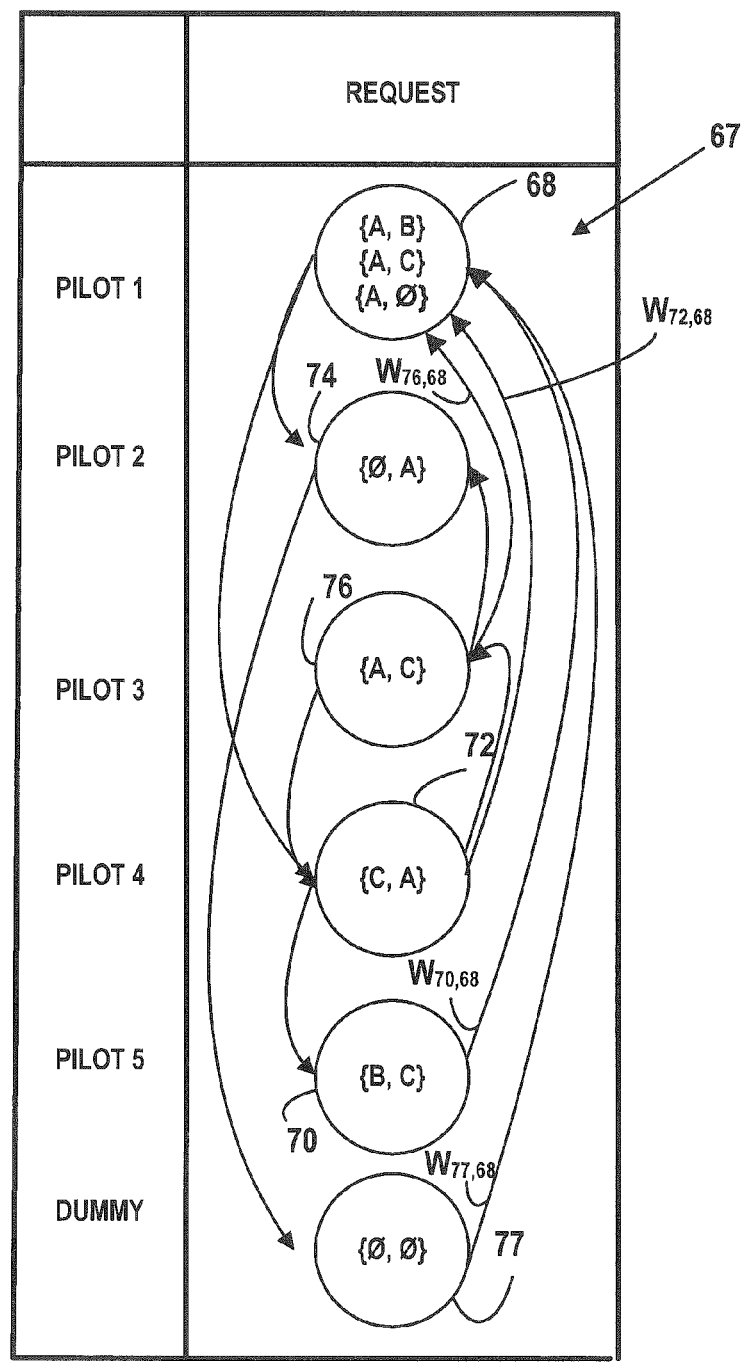
FIG. 7A is another diagrammatic illustration of the optimization network of FIG. 6.

In an exemplary embodiment, as illustrated in FIG. 7A with continuing reference to FIGS. 3A, 3B and 6, the nodes 68, 70, 72, 74 and 76 have been ranked by seniority according to the step 44, with pilot 1 being the most senior pilot and pilot 5 being the least senior pilot. The dummy node 77 is located at the bottom of the list. Data has already been received at the step 38 and no nodes have been removed at the steps 40 and 43 because none of the nodes 68, 70, 72, 74 and 76 are illegal or invalid. The optimization network 67 has been generated according to the step 42. In this example, a first unsolved node (the node 68) associated with the highest ranked pilot (pilot 1) has been identified as the node n according to the step 46.

Figure 7B:
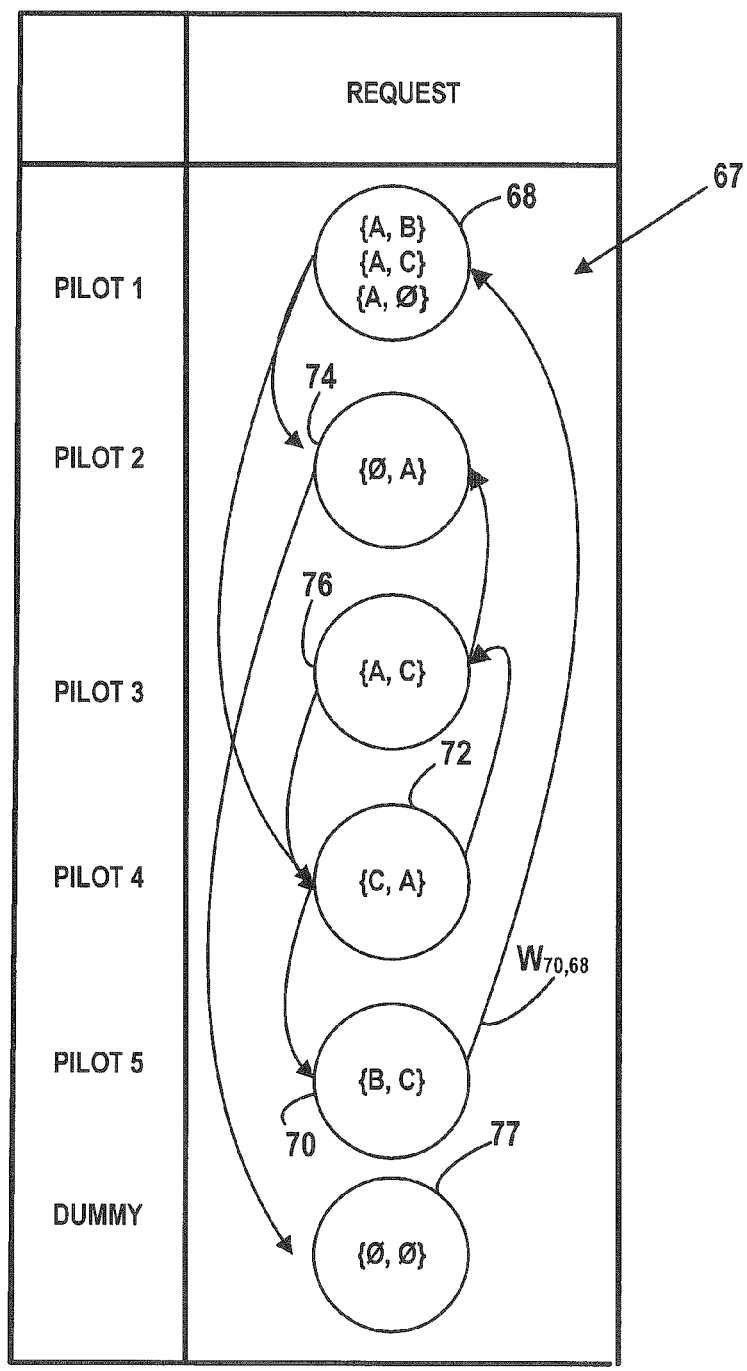
FIG. 7B is another diagrammatic illustration of the optimization network of FIG. 6, according to an exemplary embodiment.

In an exemplary embodiment, as illustrated in FIG. 7B with continuing reference to FIGS. 3A, 3B and 6, the flow into the node 68 from the other nodes has been maximized using function (7), subject to constraint sets (2) and (3), according to the step 48. At the step 50, a cycle involving the highest weighted arc $W_{70,68}$ is identified. This cycle involves the nodes 68, 72 and 70. At the step 58, all directional arcs are checked to ensure that they are legal. The directional arcs $W_{72,68}$, $W_{76,68}$, and $W_{77,68}$, which have lower arc weights than $W_{70,68}$, and that point toward the node 68 are then removed from the optimization network 67 for all subsequent steps. The method 36 continues to solve for the nodes 70, 72, 74 and 76 using the optimization network 67, which has been modified as shown in FIG. 7B.

Another example of a nested preference, which is not shown in FIG. 6, is a request to drop trip A and pick up trip B, if trip B is not available, then pick up a trip that matches a pre-defined set of criteria, if no trips within the pre-defined set of criteria are available, then just drop trip A.

Figure 8:
FIG. 8 is a table of requests, according to an exemplary embodiment.
Figure 9:
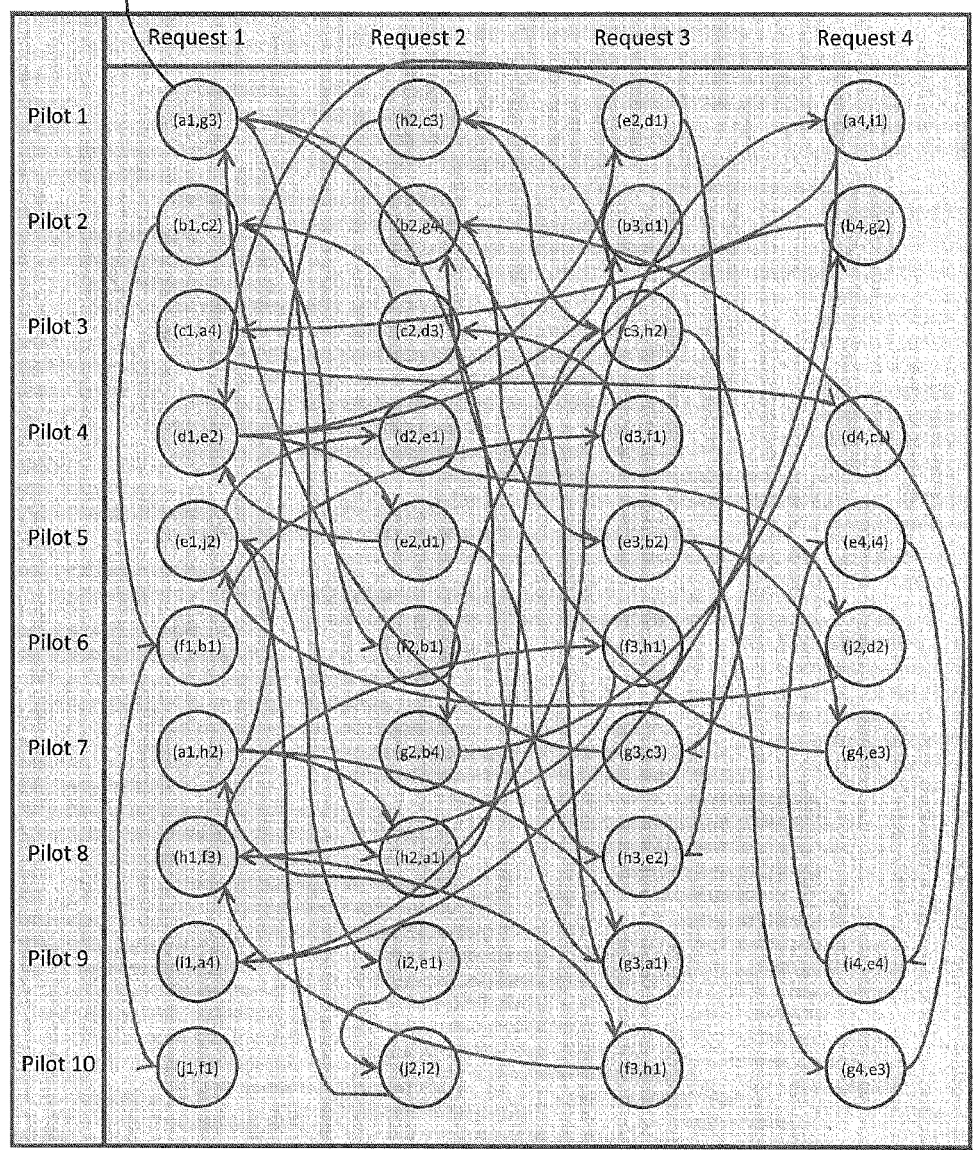
FIG. 9 is a diagrammatic illustration of an optimization network for the table of requests in FIG. 8, according to the exemplary embodiment.

In another embodiment, as illustrated in FIGS. 8, 9 and 10 with continuing reference to FIGS. 3A and 3B, a plurality of user requests 78 is associated with Pilots #1 through #10. As shown in FIG. 8, each of the Pilots #1 through #10 has up to four user requests, namely Requests #1 through #4, with the Request #1 being the most desirable request and the Request #4 being an acceptable, but less desirable request. As shown in FIG. 9, an optimization network 79 includes a plurality of nodes 79a associated with the requests 78 that have been ranked by business objectives according to the step 44, with Pilot #1 being the most senior pilot and Pilot #10 being the least senior pilot. The business objective requires the nodes 79a to be ranked according to the seniority of the user that is associated with the node, according to each individual user's node order (starting with Request #1) and according to the overall equity of trades, with this type of ranking being considered a multi-objective ranking. In FIG. 9, data has already been received at the step 38 and no nodes 79a have been removed at the step 40 because none of the nodes 79a are illegal. The optimization network 79 has been generated according to the step 42. In this example, the optional step 43 was not executed. Therefore, invalid nodes, such as the node associated with Request 4 of Pilot #4, have not been removed from the optimization network 79. After solving the optimization model for each node 79a, an optimal solution 79b is shown in FIG. 10. The optimal solution 79b honors seniority and equity of the users and provides traceability and transparency for all users. For example, Request #1 of Pilot #10 was denied due to "NTA," meaning no trades were available, that is, no directional arcs were identified that involved the node associated with this request. Additionally, Request 3 of Pilot #1 was denied due to the Request #1 of Pilot #4 being fulfilled. In one embodiment, the transparency and traceability is important because the logic of the method of 36 is validated and the users are more likely to accept the optimal solution 79b. The multi-objective ranking of the nodes 79a allows for a maximum of nodes 79a or requests 78 to be satisfied while guaranteeing that the predetermined set of rules of the step 58 of the method 36 are not violated. Another embodiment considers pilot qualifications, in addition to the predetermined set of rules at the step 58.

Figure 11:
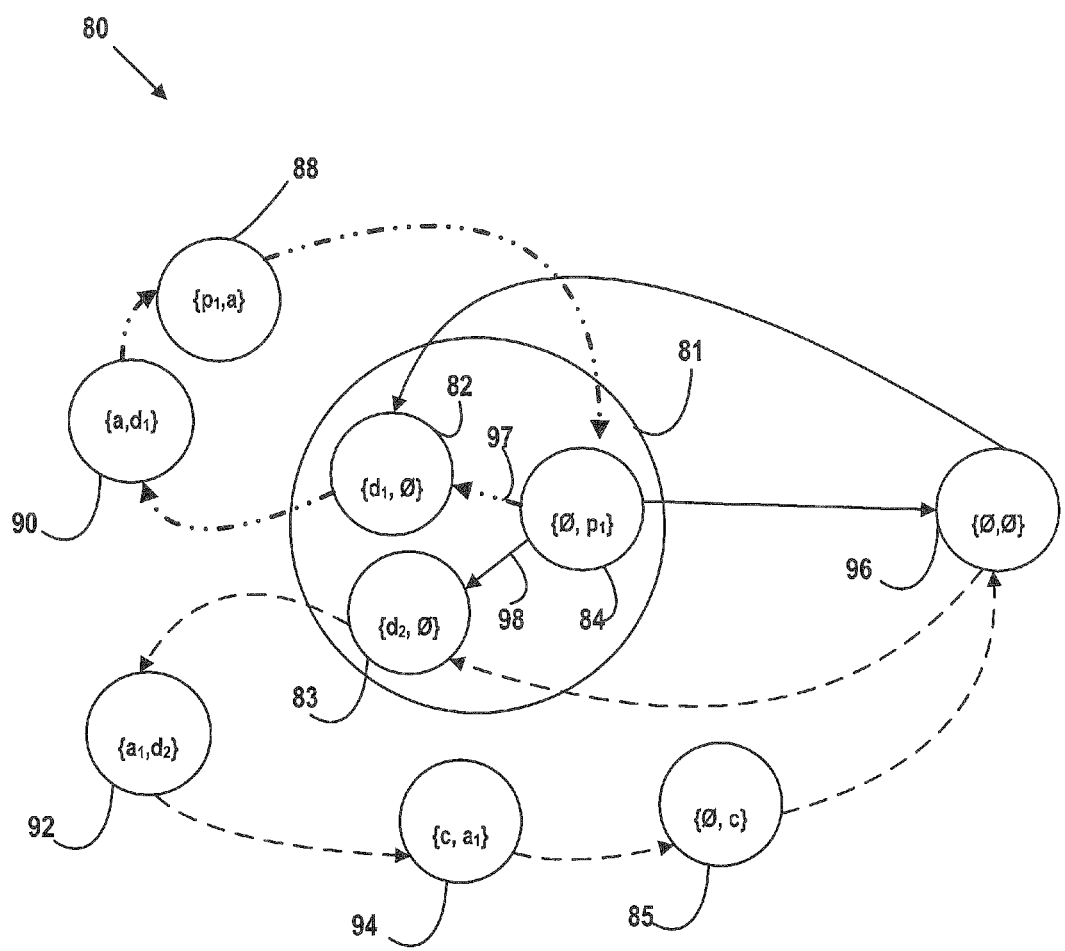
FIG. 11 is a diagrammatic illustration of an optimization network involving multi-drop requests, according to an exemplary embodiment.

In another embodiment, as illustrated in FIG. 11, an optimization network involving multi-drop off or multi-pick up requests is generally referred to by the reference numeral 80 and includes a super node 81 and three sub-nodes 82, 83 and 84. The pilot associated with the super node 81 wants to drop trip $d_1$, drop trip $d_2$ and pick up trip $p_1$, with these requests represented as the sub-nodes 82, 83 and 84, respectively. A multi-drop request involves a request to drop multiple trips and pick up one trip. A multi-pick up requests involves a request to drop one trip and pick up multiple trips. The optimization network 80 includes the nodes 82, 83, and 84, as well as nodes 85, 88, 90, 92, 94 and 96. A special directional arc 97 points from the node 84 to the node 82, and a special directional arc 98 points from the node 84 to the node 83. Since the optimization network 80 involves a multi-drop off request represented by the super node 81, a constraint set is added to the mixed-integer program as follows:

Subject to:

$$\sum_{i \in Out(82)} x_{82,i} = \sum_{j \in Out(83)} x_{83,j} = \sum_{k \in Out(84)} x_{84,k} \quad (8)$$

Where
i belongs to the set of arcs pointing out of the node 82,
j belongs to the set of arcs pointing out of the node 83, and
k belongs to the set of arcs pointing out of the node 84.

The constraint set (8) ensures that the flow out of every sub-node 82, 83 and 84 in the super node 81 is equal. The constraint set (8) can be generalized to solve any multi-drop and/or multi-pick up request.

In an exemplary embodiment, as illustrated in FIGS. 12A and 12B, a method of operating the system 10 is generally referred to by the reference numeral 100. Steps 102, 104, 106, 107, 108, 110, 112, 114, 120, 122 and 124 are substantially similar to the steps 38, 40, 42, 43, 44, 46, 48, 50, 56, 60 and 62, respectively, and therefore will not be discussed in detail. The method 100 does not include steps that are similar to the steps 52, 54, 56 and 57 of the method 36. Instead, at the step 114 of the method 100, if it is determined at the step 114 that there is no cycle that involves the node n, step 116 is the next step, at which the ranking of the nodes is updated based on a new situation. The new situation may involve a new solution or new business objectives. At step 118, the first unsolved node is now the node n.

In another embodiment, the nodes can be solved based on a conflict resolution period order. A conflict resolution period order is a way of ranking nodes in which trip conflicts are resolved while honoring seniority and equity rules. This order can include: solving only the nodes that directly resolve conflicts while following the seniority and equity orders; solving the nodes that do not resolve their own conflicts but do resolve other conflicts while following the seniority and equity orders; and finally solving the remaining requests while following the seniority and equity orders.

In another embodiment, the nodes can be solved based on a secondary lines generation, in which as many unconditional requests are satisfied as possible while following the seniority and equity orders. This secondary lines generation can be integrated with the conflict resolution period order or can be a stand-alone method.

In another embodiment, a directional arc may connect two nodes if the trips associated with the nodes have a same language. For example, a trip in a drop request associated with a node X could have a specific sequence ID consisting of a 3-day trip starting on day 7 of the month with an overnight stay in CUN and MIA. A pick up request associated with a node Z could be any 3-day trip beginning on day 6, 7 or 8 that includes an overnight in CUN. There could be several different sequences that match the pick up request associated with the node Z, including the drop request associated with the node X. In an exemplary embodiment, nodes or requests can contain specific sequence or trip numbers or generic descriptions of the kind of sequence or trip being requested.

In another embodiment, all possible combinations of directional arcs could be checked for legality before running the optimization model. However, in an exemplary embodiment, the legality of the proposed optimal solution is checked after each optimization run. This results in fewer legality checks, fewer unnecessary constraints and minimum computation time. Each pilot may have multiple nodes, and checking the legality of each node may not be sufficient. One node may be legal alone, but may result in an illegal node when combined with other nodes for that pilot. Conversely, some nodes may be illegal alone, but in combination with other nodes by the pilot, they are legal. For example, one pilot has two nodes. The first node is to pick up a sequence of flying that starts on day 12 of the month and lasts either two, three or four days. The second node is to pick up a 2-day sequence starting on day 15 of the month. Assuming a legality condition that no more than one sequence can be assigned on any given day of the month, then it is clear that both nodes 1 and 2 can be awarded as long as the first node is not satisfied with a 4 day sequence. If the first node is satisfied with a 4-day sequence, then any sequence that satisfied the second node will result in an illegal node, since there will be two sequences assigned on day 15.

As a result of the operation of the system 10 or the execution of the method 36 and/or 100, requests associated with an unlimited number of users or pilots can be paired or traded while honoring seniority and equity requirements, which results in an optimal solution that honors seniority and equity requirements. As a result of the incorporation of conditional requests in the system 10 or the method 36 or 100, more requests will be submitted than would be submitted in a system that requires the user to drop a trip without guaranteeing that the pilot can pick up a trip of their choice. As the number of requests submitted grows, the number of requests that can be satisfied grows as well. Pilot requests remain for a specific period of time and are satisfied as soon as a feasible trade is found; therefore, pilots do not need to continuously monitor the pool of available trips that can be picked up. In addition, as a result of the operation of the method 100 or 36, an optimal solution is found that provides transparency regarding how the requests were awarded and why a specific request could not be awarded. This transparency will allow a user to understand why his or her request was or was not satisfied, which should increase the user's satisfaction with the trade.

In one embodiment, trips assigned to a pilot in a first bid-line that conflict with trips assigned to the pilot in a second bid-line are automatically removed from the pilot's second bid-line and are added to an "open time" set. The trips in the "open time" set are considered uncovered trips, that is, trips not associated with any user's schedule. In one embodiment, a node for each uncovered trip can be included in an optimization network. For example, if there is an uncovered trip A in open time, a node {A, 0} would be formed and included in the optimization network as an unconditional request. In one embodiment, the method 36 or 100 can limit the number of uncovered trips in a specific time period to some predetermined maximum threshold. In one embodiment, one source of data to be received at the step 38 or at the step 102 or at both is information relating to the uncovered trips in the open time set. Reducing the number of uncovered trips in the "open time" set is beneficial because it conserves reserve pilot resources and reduces costs.

In several exemplary embodiments, a trade request can be a request to reallocate or trade a work shift assignment, such as a work shift assignment in the law enforcement, maintenance, manufacturing, or municipality industries. In several exemplary embodiments, a trade request can be a request to reallocate or trade one or more assets, such as one or more goods, services, work shift assignments, or any combination thereof.

Figure 13:
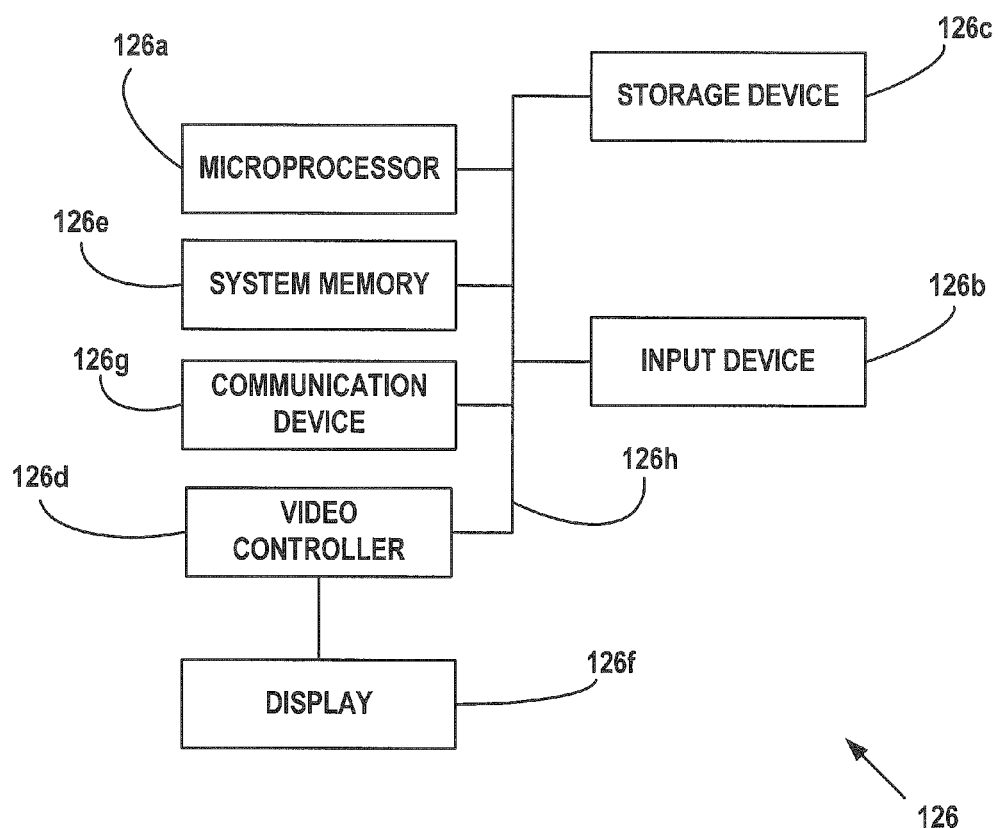
FIG. 13 is a diagrammatic illustration of a computing device for implementing one or more exemplary embodiments of the present disclosure, according to an exemplary embodiment.

In an exemplary embodiment, as illustrated in FIG. 13 with continuing reference to FIGS. 1, 2, 3A, 3B, 4A, 4B, 5, 6, 7A, 7B, 8, 9, 10, 11, 12A and 12B, an illustrative computing device 126 for implementing one or more embodiments of one or more of the above-described networks, elements, methods and/or steps, and/or any combination thereof, is depicted. The computing device 126 includes a processor 126a, an input device 126b, a storage device 126c, a video controller 126d, a system memory 126e, a display 126f, and a communication device 126g, all of which are interconnected by one or more buses 126h. In several exemplary embodiments, the storage device 126c may include a floppy drive, hard drive, CD-ROM, optical drive, any other form of storage device and/or any combination thereof. In several exemplary embodiments, the storage device 126c may include, and/or be capable of receiving, a floppy disk, CD-ROM, DVD-ROM, or any other form of computer readable medium that may contain executable instructions. In several exemplary embodiments, the communication device 126g may include a modem, network card, or any other device to enable the computing device 126 to communicate with other computing devices. In several exemplary embodiments, any computing device represents a plurality of interconnected (whether by intranet or Internet) computer systems, including without limitation, personal computers, mainframes, PDAs, smartphones and cell phones.

In several exemplary embodiments, one or more of the module 12, the computer processor 14, the computer readable medium 16, the database 18, and/or one or more components thereof, are, or at least include, the computing device 126 and/or components thereof, and/or one or more computing devices that are substantially similar to the computing device 126 and/or components thereof. In several exemplary embodiments, one or more of the above-described components of one or more of the computing device 126, the module 12, the computer processor 14, the computer readable medium 16, the database 18, and/or one or more components thereof, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a computing device such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 22, and/or one or more portions thereof, may be designed to work on any specific architecture. In an exemplary embodiment, one or more portions of the network 22 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a computer program, such as a plurality of instructions stored on a computer readable medium, such as the computer readable medium 16, the system memory 126e, and/or any combination thereof, may be executed by a processor to cause the processor to carry out or implement in whole or in part the operation of the system 10, one or more of the methods 36 and 100, and/or any combination thereof. In several exemplary embodiments, such a processor may include one or more of the computer processor 14, the processor 126a, and/or any combination thereof. In several exemplary embodiments, such a processor may execute the plurality of instructions in connection with a virtual computer system.

A method has been described that includes receiving, using a computing device, data associated with a plurality of trade requests; generating, using the computing device, an optimization network using the data, the optimization network including a plurality of nodes, each of the nodes corresponding to at least one trade request; ranking, using the computing device, the nodes in accordance with at least one business objective; and fulfilling, using the computing device, one or more of the trade requests in an order based on the ranking of the nodes by generating a solution using the optimization network and the at least one business objective, the solution complying with one or more predetermined rules. In an exemplary embodiment, each trade request in the plurality of trade requests includes at least one of the following: a request to add a first assignment; a request to drop a second assignment; and a request to drop a third assignment in exchange for adding a fourth assignment. In an exemplary embodiment, each trade request in the plurality of trade requests is a trade request by a user; and wherein the at least one business objective is based on user seniority. In an exemplary embodiment, each user is an airline crew member; and wherein the first, second, third and fourth assignments correspond to respective airline flight sequences, each airline flight sequence comprising at least one airline flight. In an exemplary embodiment, the optimization network further includes a plurality of directional arcs, each of the directional arcs extending between two nodes in the plurality of nodes and representing a supply-to-demand relationship between the two nodes. In an exemplary embodiment, the ranking of the nodes results in a highest ranked node; and wherein generating the solution includes solving an optimization model for the highest ranked node; determining whether a cycle that includes the highest ranked node exists, the cycle including at least two directional arcs in the plurality of directional arcs; if a cycle including the highest ranked node exists, then: determining whether the at least two directional arcs comply with the one or more predetermined rules; if the at least two directional arcs comply with the one or more predetermined rules, then adding a fulfillment constraint; and if the at least two directional arcs do not comply with the one or more predetermined rules, then adding a legality constraint; if a cycle including the highest ranked node does not exist, then solving the optimization model for another node. In an exemplary embodiment, each trade request in the plurality of trade requests is a request by an airline crew member; and wherein the at least one business objective is based on airline crew member seniority. In an exemplary embodiment, the highest ranked node corresponds to a request by a first airline crew member; and wherein the another node corresponds to a request by either the first airline crew member or a second airline crew member. In an exemplary embodiment, at least one of the nodes corresponds to at least two requests, the at least two requests having a hierarchy ranging from a most desirable request to a least desirable request; wherein first and second directional arcs point to the at least one of the nodes, the first and second directional arcs having first and second weights, respectively; and wherein the first weight is greater than the second weight to reflect the hierarchy. In an exemplary embodiment, the method includes outputting the solution so that: one or more requests that have been fulfilled are indicated; one or more requests that have not been fulfilled are indicated; and one or more reasons associated with the one or more requests that have not been fulfilled, respectively, are indicated.

An apparatus has been described that includes one or more processors; a computer readable medium operably coupled to the one or more processors; and a plurality of instructions stored on the computer readable medium and executable by the one or more processors, the plurality of instructions including instructions that cause the one or more processors to receive data associated with a plurality of trade requests; instructions that cause the one or more processors to generate an optimization network using the data, the optimization network including a plurality of nodes, each of the nodes corresponding to at least one trade request; instructions that cause the one or more processors to rank the nodes in accordance with at least one business objective; and instructions that cause the one or more processors to fulfill one or more of the trade requests in an order based on the ranking of the nodes by generating a solution using the optimization network and the at least one business objective, the solution complying with one or more predetermined rules. In an exemplary embodiment, each trade request in the plurality of trade requests includes at least one of the following: a request to add a first assignment; a request to drop a second assignment; and a request to drop a third assignment in exchange for adding a fourth assignment. In an exemplary embodiment, each trade request in the plurality of trade requests is a request by a user; and wherein the at least one business objective is based on user seniority. In an exemplary embodiment, each user is an airline crew member; and wherein the first, second, third and fourth assignments correspond to respective airline flight sequences, each airline flight sequence comprising at least one airline flight. In an exemplary embodiment, the optimization network further includes a plurality of directional arcs, each of the directional arcs extending between two nodes in the plurality of nodes and representing a supply-to-demand relationship between the two nodes. In an exemplary embodiment, the ranking of the nodes results in a highest ranked node; and wherein the instructions that cause the one or more processors to generate the solution include instructions that cause the one or more processors to solve an optimization model for the highest ranked node; instructions that cause the one or more processors to determine whether a cycle that includes the highest ranked node exists, the cycle including at least two directional arcs in the plurality of directional arcs; instructions that, if a cycle including the highest ranked node exists, cause the one or more processors to: determine whether the at least two directional arcs comply with the one or more predetermined rules; if the at least two directional arcs comply with the one or more predetermined rules, then add a fulfillment constraint; and if the at least two directional arcs do not comply with the one or more predetermined rules, then add a legality constraint; instructions that, if a cycle including the highest ranked node does not exist, cause the one or more processors to solve the optimization model for another node. In an exemplary embodiment, each trade request in the plurality of trade requests is a request by an airline crew member; and wherein the at least one business objective is based on airline crew member seniority. In an exemplary embodiment, the highest ranked node corresponds to a trade request by a first airline crew member; and wherein the another node corresponds to a trade request by either the first airline crew member or a second airline crew member. In an exemplary embodiment, at least one of the nodes corresponds to at least two trade requests, the at least two trade requests having a hierarchy ranging from a most desirable trade request to a least desirable trade request; wherein first and second directional arcs point to the at least one of the nodes, the first and second directional arcs having first and second weights, respectively; and wherein the first weight is greater than the second weight to reflect the hierarchy. In an exemplary embodiment, the plurality of instructions further includes instructions that cause the one or more processors to output the solution so that: one or more trade requests that have been fulfilled are indicated; one or more trade requests that have not been fulfilled are indicated; and one or more reasons associated with the one or more trade requests that have not been fulfilled, respectively, are indicated.

It is understood that variations may be made in the foregoing without departing from the scope of the present disclosure.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

What is claimed is:

1. A method, comprising:
   receiving, using a computing device, data associated with a plurality of trade requests, with each trade request in the plurality of trade requests being a request by a user;
   generating, using the computing device, an optimization network using the data, the optimization network comprising a plurality of nodes, each of the nodes corresponding to at least one trade request;
   ranking, using the computing device, the nodes in accordance with at least one business objective that is based on user seniority;
   simultaneously fulfilling, using the computing device, one or more of the trade requests in an order based on the ranking of the nodes by generating a solution using the optimization network and the at least one business objective, the solution complying with one or more predetermined rules; and
   outputting the solution so that:
      one or more trade requests that have been fulfilled are indicated;
      one or more trade requests that have not been fulfilled are indicated; and
      one or more reasons associated with the one or more trade requests that have not been fulfilled, respectively, are indicated;
   wherein the optimization network further comprises a plurality of directional arcs, each of the directional arcs extending between two nodes in the plurality of nodes and representing a supply-to-demand relationship between the two nodes;
   wherein the ranking of the nodes results in a highest ranked node;
   wherein generating the solution comprises:
      solving an optimization model for the highest ranked node;
      determining whether a cycle that includes the highest ranked node exists, the cycle including at least two directional arcs in the plurality of directional arcs, with one directional arc of the at least two directional arcs pointing to the highest ranked node and another directional arc of the at least two directional arcs pointing away from the highest ranked node;
      if a cycle including the highest ranked node exists, then:
         determining whether the at least two directional arcs comply with the one or more predetermined rules;
         if the at least two directional arcs comply with the one or more predetermined rules, then adding a fulfillment constraint; and
         if the at least two directional arcs do not comply with the one or more predetermined rules, then adding a legality constraint to guarantee compliance with the one or more predetermined rules;
      and
      if a cycle including the highest ranked node does not exist, then denying the trade request associated with the highest ranked node and solving the optimization model for another node;
   wherein:
      determining whether the at least two directional arcs comply with the one or more predetermined rules only after determining whether a cycle that includes the highest rank node exists;
adding a fulfillment constraint only if the at least two directional arcs comply with the one or more predetermined rules; and
adding a legality constraint only if the at least two directional arcs do not comply with the one or more predetermined rules;
results in fewer legality checks, fewer unnecessary constraints, and minimum computation time thereby improving the function of the computing device;
wherein each trade request in the plurality of trade requests comprises at least one of the following:
a request to add a first assignment;
a request to drop a second assignment; and
a request to drop a third assignment in exchange for adding a fourth assignment;
wherein the first, second, third and fourth assignments correspond to respective airline flight sequences, each airline flight sequence comprising at least one airline flight;
wherein each user is an airline crew member;
wherein user seniority is airline crew member seniority;
wherein the highest ranked node corresponds to a trade request by a first airline crew member; and
wherein the another node corresponds to a trade request by either the first airline crew member or a second airline crew member.

2. The method of claim 1,
wherein at least one of the nodes corresponds to at least two trade requests, the at least two trade requests having a hierarchy ranging from a most desirable trade request to a least desirable trade request;
wherein first and second directional arcs point to the at least one of the nodes, the first and second directional arcs having first and second weights, respectively; and
wherein the first weight is greater than the second weight to reflect the hierarchy.

3. An apparatus, comprising:
one or more processors;
a computer readable medium operably coupled to the one or more processors; and
a plurality of instructions stored on the computer readable medium and executable by the one or more processors, the plurality of instructions comprising:
instructions that cause the one or more processors to receive data associated with a plurality of trade requests, with each trade request in the plurality of trade requests being a request by a user;
instructions that cause the one or more processors to generate an optimization network using the data, the optimization network comprising a plurality of nodes, each of the nodes corresponding to at least one trade request;
instructions that cause the one or more processors to rank the nodes in accordance with at least one business objective that is based on user seniority;
instructions that cause the one or more processors to simultaneously fulfill one or more of the trade requests in an order based on the ranking of the nodes by generating a solution using the optimization network and the at least one business objective, the solution complying with one or more predetermined rules; and
instructions that cause the one or more processors to output the solution so that:
one or more trade requests that have been fulfilled are indicated;
one or more trade requests that have not been fulfilled are indicated; and
one or more reasons associated with the one or more trade requests that have not been fulfilled, respectively, are indicated;
wherein the optimization network further comprises a plurality of directional arcs, each of the directional arcs extending between two nodes in the plurality of nodes and representing a supply-to-demand relationship between the two nodes;
wherein the ranking of the nodes results in a highest ranked node;
wherein the instructions that cause the one or more processors to generate the solution comprise:
instructions that cause the one or more processors to solve an optimization model for the highest ranked node;
instructions that cause the one or more processors to determine whether a cycle that includes the highest ranked node exists, the cycle including at least two directional arcs in the plurality of directional arcs, with one directional arc of the at least two directional arcs pointing to the highest ranked node and another directional arc of the at least two directional arcs pointing away from the highest ranked node;
instructions that, if a cycle including the highest ranked node exists, cause the one or more processors to:
determine whether the at least two directional arcs comply with the one or more predetermined rules;
if the at least two directional arcs comply with the one or more predetermined rules, then add a fulfillment constraint; and
if the at least two directional arcs do not comply with the one or more predetermined rules, then add a legality constraint to guarantee compliance with the one or more predetermined rules; and
instructions that, if a cycle including the highest ranked node does not exist, cause the one or more processors to solve the optimization model for another node;
wherein:
determining whether the at least two directional arcs comply with the one or more predetermined rules only after determining whether a cycle that includes the highest rank node exists;
adding a fulfillment constraint only if the at least two directional arcs comply with the one or more predetermined rules; and
adding a legality constraint only if the at least two directional arcs do not comply with the one or more predetermined rules;
results in fewer legality checks, fewer unnecessary constraints, and minimum computation time thereby improving the function of the computing device;
wherein each trade request in the plurality of trade requests comprises at least one of the following:
a request to add a first assignment;
a request to drop a second assignment; and
a request to drop a third assignment in exchange for adding a fourth assignment;

wherein the first, second, third and fourth assignments correspond to respective airline flight sequences, each airline flight sequence comprising at least one airline flight;
wherein each user is an airline crew member;
wherein user seniority is airline crew member seniority;
wherein the highest ranked node corresponds to a trade request by a first airline crew member; and
wherein the another node corresponds to a trade request by either the first airline crew member or a second airline crew member.

4. The apparatus of claim 3, wherein at least one of the nodes corresponds to at least two trade requests, the at least two trade requests having a hierarchy ranging from a most desirable trade request to a least desirable trade request;
wherein first and second directional arcs point to the at least one of the nodes, the first and second directional arcs having first and second weights, respectively; and
wherein the first weight is greater than the second weight to reflect the hierarchy.

5. A method, comprising:
receiving, using a computing device, data associated with a plurality of trade requests, with each trade request in the plurality of trade requests being a request by a user;
generating, using the computing device, an optimization network using the data, the optimization network comprising a plurality of nodes, each of the nodes corresponding to at least one trade request;
ranking, using the computing device, the nodes in accordance with at least one business objective that is based on user seniority;
simultaneously fulfilling, using the computing device, one or more of the trade requests in an order based on the ranking of the nodes by generating a solution using the optimization network and the at least one business objective, the solution complying with one or more predetermined rules; and
outputting the solution so that:
one or more trade requests that have been fulfilled are indicated;
one or more trade requests that have not been fulfilled are indicated; and
one or more reasons associated with the one or more trade requests that have not been fulfilled, respectively, are indicated;
wherein the optimization network further comprises a plurality of directional arcs, each of the directional arcs extending between two nodes in the plurality of nodes and representing a supply-to-demand relationship between the two nodes;
wherein the ranking of the nodes results in a highest ranked node;
wherein generating the solution comprises:
solving an optimization model for the highest ranked node;
determining whether a cycle that includes the highest ranked node exists, the cycle including at least two directional arcs in the plurality of directional arcs, with one directional arc of the at least two directional arcs pointing to the highest ranked node and another directional arc of the at least two directional arcs pointing away from the highest ranked node;
if a cycle including the highest ranked node exists, then:
determining whether the at least two directional arcs comply with the one or more predetermined rules;
if the at least two directional arcs comply with the one or more predetermined rules, then adding a fulfillment constraint; and
if the at least two directional arcs do not comply with the one or more predetermined rules, then adding a legality constraint to guarantee compliance with the one or more predetermined rules;
if a cycle including the highest ranked node does not exist, then denying the trade request associated with the highest ranked node and solving the optimization model for another node;
wherein:
determining whether the at least two directional arcs comply with the one or more predetermined rules only after determining whether a cycle that includes the highest rank node exists;
adding a fulfillment constraint only if the at least two directional arcs comply with the one or more predetermined rules; and
adding a legality constraint only if the at least two directional arcs do not comply with the one or more predetermined rules;
results in fewer legality checks, fewer unnecessary constraints, and minimum computation time thereby improving the function of the computing device;
wherein the solution is generated using a mixed integer program, the mixed integer program comprising a problem represented by:
maximize $$\sum_{i \in In(n)} x_{i,n} \quad (1)$$

subject to $$\sum_{j \in Out(i)} x_{i,j} - \sum_{j \in In(i)} x_{i,j} = 0 \quad \forall\, i \in NA \quad (2)$$

where N is the set of nodes in the optimization network excluding a dummy node;
where NA is the set of all nodes in the optimization network including the dummy node;
where In(i) is the set of directional arcs pointing into a node i;
where Out(i) is the set of directional arcs emanating from a node i; and
where $x_{i,j}$ is the unit flow from the node i to j, where $$x_{i,j} = \begin{cases} 1 & \text{if unit flow exists from the node } i \text{ to } j, \\ 0 & \text{otherwise} \end{cases}.$$

wherein each trade request in the plurality of trade requests comprises at least one of the following:
a request to add a first assignment;
a request to drop a second assignment; and
a request to drop a third assignment in exchange for adding a fourth assignment;
wherein the first, second, third and fourth assignments correspond to respective airline flight sequences, each airline flight sequence comprising at least one airline flight;

wherein each user is an airline crew member;
wherein user seniority is airline crew member seniority;
wherein the highest ranked node corresponds to a trade request by a first airline crew member; and
wherein the another node corresponds to a trade request by either the first airline crew member or a second airline crew member.

* * * * *